(12) United States Patent
Vanotti et al.

(10) Patent No.: US 9,926,213 B2
(45) Date of Patent: Mar. 27, 2018

(54) SYSTEMS AND METHODS FOR RECOVERING AMMONIUM AND PHOSPHORUS FROM LIQUID EFFLUENTS

(71) Applicant: The United States of America, as represented by the Secretary of Agriculture, Washington, DC (US)

(72) Inventors: Matias B. Vanotti, Florence, SC (US); Ariel A. Szogi, Florence, SC (US); Patrick J. Dube, Florence, SC (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 57 days.

(21) Appl. No.: 15/170,129

(22) Filed: Jun. 1, 2016

(65) Prior Publication Data

US 2016/0347630 A1 Dec. 1, 2016

Related U.S. Application Data

(60) Provisional application No. 62/169,387, filed on Jun. 1, 2015.

(51) Int. Cl.
*B01D 53/22* (2006.01)
*B01D 19/00* (2006.01)
(Continued)

(52) U.S. Cl.
CPC ........ *C02F 1/5236* (2013.01); *B01D 19/0031* (2013.01); *B01D 21/01* (2013.01); *B01D 53/22* (2013.01); *C02F 9/00* (2013.01); *C02F 1/20* (2013.01); *C02F 1/44* (2013.01); *C02F 1/5254* (2013.01); *C02F 1/66* (2013.01); *C02F 11/04* (2013.01); *C02F 2101/105* (2013.01); *C02F 2101/16* (2013.01); *C02F 2103/20* (2013.01); *C02F 2209/06* (2013.01)

(58) Field of Classification Search
CPC .... B01D 19/0031; B01D 21/01; B01D 53/22; B01D 53/229; B01D 53/58; B01D 61/362; B01D 63/02; B01D 63/08; B01D 2257/406; C02F 1/20; C02F 1/44; C02F 1/5236; C02F 1/5254; C02F 1/66; C02F 11/04; C02F 2101/105; C02F 2101/16; C02F 2103/20; C02F 2209/06
See application file for complete search history.

(56) References Cited

U.S. PATENT DOCUMENTS 6,893,567 B1 * 5/2005 Vanotti ................. C02F 1/5245
 210/220
9,005,333 B1 * 4/2015 Vanotti ................. B01D 53/58
 210/259

(Continued)

OTHER PUBLICATIONS

"Successful Ammonia Removal from Wastewater Using Liqui-Cel(R) Membrane Contactors at a European Manufacturing Facility", Liqui-Cel Membrane Contators, TechBrief, Jan. 2005, 1 page.*

*Primary Examiner* — Jason M Greene
(74) *Attorney, Agent, or Firm* — John D. Fado; Ariel L. Atkinson

(57) ABSTRACT

A system and method for capture of ammonia and phosphorus from an ammonia and phosphorus containing liquid effluent. The invention allows for the precipitation of phosphorus from said liquid effluent that has been under low aeration and has a pH of greater than about pH 9.

13 Claims, 14 Drawing Sheets

(51) Int. Cl.
  *C02F 1/52* (2006.01)
  *B01D 21/01* (2006.01)
  *C02F 1/20* (2006.01)
  *C02F 9/00* (2006.01)
  C02F 101/10 (2006.01)
  C02F 101/16 (2006.01)
  C02F 103/20 (2006.01)
  C02F 1/44 (2006.01)
  C02F 1/66 (2006.01)
  C02F 11/04 (2006.01)

(56) References Cited

U.S. PATENT DOCUMENTS

2011/0104021 A1* 5/2011 Curello ................. B01D 53/22
  422/240
2012/0315209 A1* 12/2012 Bisson .................. B01D 61/58
  423/352

* cited by examiner

SYSTEMS AND METHODS FOR RECOVERING AMMONIUM AND PHOSPHORUS FROM LIQUID EFFLUENTS

FIELD OF THE INVENTION

This invention relates to a system 20 and method for the simultaneous removal and recovery of ammonia and phosphorus from wastewater using magnesium chloride to precipitate phosphorus from wastewater.

BACKGROUND OF THE ART

Municipal and agricultural waste disposal is a major problem. Feedlots, animal barns, agroindustrial plants, municipal sewage, and farms that keep large numbers of animals are sources of enormous quantities of organic waste. The disposal of untreated organic waste causes serious pollution problems which include those tied to the wastes high content of chemically oxidizable components, expressed as COD or chemical oxygen demand, and BOD, biological or biochemical oxygen demand. When these pollutants reach bodies of water, either because they leach from disposal sites or as a consequence of being directly released or transported into water bodies, they deoxygenate the receiving waters and impair the receiving waters' capability to support aquatic life.

Acidity and high pathogen content add to the COD and BOD problems of untreated waste disposal. Acrid gases released into the atmosphere are not only unpleasant but they can also contribute to acid deposition, global greenhouse effects, and ozone depletion.

For agricultural animals, the animals are confined in high densities and lack functional and sustainable waste treatment systems. The liquid wastes are generally treated in large anaerobic lagoons with intermittent disposal through land applications (Stith, P. and Warrick, J., Boss Hog, North Carolina's pork revolution, The News & Observer, 1-3, Feb. '9-26, 1995; USEPA, Proposed regulations to address water pollution from concentrated animal feeding operations, EPA 833-F-00-016, January 2001, Office of Water, Washington, D.C., 20460). This system was developed in the early and mid-20$^{th}$ century prior to the current trend in high concentrated livestock operations. One of the main problems in sustainability is the imbalance of nitrogen (N) and phosphorus applied to land (USEPA, supra; Cochran et al., Dollars and Sense: An economic analysis of alternative hog waste management technologies, Environmental Defenses, Washington D.C., 2000). Nutrients in manure are not present in the same portion needed by crops, and when manure is applied based on a crop's nitrogen requirement, excessive phosphorus is applied resulting in phosphorus accumulation in soil, phosphorus runoff, and eutrophication of surface waters (Heathwaite et al., A conceptual approach for integrating phosphorus and nitrogen management at watershed scales, J. Environ. Qual., Volume 29, 158-166, 2000; Sharpley et al., Practical and innovative measures for the control of agricultural phosphorus losses to water: An overview, Journal Environ. Qual., Volume 29, 1-9, 2000; Edwards and Daniel, Environmental impacts of On-Farm Poultry Waste Disposal-A Review, Bioresource Technology, Volume 41, 9-33, 1992).

Conservation and recovery of nitrogen (N) and phosphorus from wastes is important in agriculture because of the high cost of commercial fertilizers. One of the largest environmental concerns with livestock and poultry production is the loss of ammonia gas ($NH_3$) from manure (Aneja et al., Measurement and analysis of atmospheric ammonia emissions from anaerobic lagoons, Atmos. Environ., 35, 1949-1958, 2001; Paerl, Coastal eutrophication and harmful algal blooms: Importance of atmospheric deposition and groundwater as "new" nitrogen and other nutrient sources. Limnol. Oceanogr. 42, 1154-1165.1997) Phosphorus (P) build-up in soils to excessively high levels due to animal manures often results in eutrophication and pollution of surface waters. Nutrient pollution in the waterways is one of the United States' most challenging environmental problems. It is caused by too much nitrogen and phosphorus runoff or discharges into the environment. Nutrient pollution has diverse and far-reaching effects on the economy of the United States, impacting many sectors that depend on clean water. The U.S. tourism industry loses about $1 billion each year, mostly from losses in fishing and recreational activities because of nutrient-polluted water bodies. As a result of phosphorus pollution, algal blooms in drinking water sources can drastically increase treatment costs and shortages in water supplies.

Phosphorus (P) build up in soils to excessively high levels due to animal manures often results in eutrophication and pollution of surface waters. Therefore, the ability to extract phosphorus from manure will be critical to the ability to accomplish waste utilization through land application without elevating soil phosphorus levels. Production of biogas from manure using anaerobic digesters (AD) is projected to be important in the future. If a new technology could be developed to recover concentrated phosphorus from AD effluents that can be removed from the watershed, then producers will also benefit from the sale of water quality credits in emerging nutrient credit programs being established through the United States of America. Another environmental and regulatory concern is the excess nitrogen (N) from the manure in confined livestock production, so farmers will be much more willing to adopt new technology for manure that addresses phosphorus and nitrogen in conjunction.

U.S. Pat. No. 6,1777,077 (Lee et al.) and U.S. Pat. No. 6,200,469 (Wallace) both relate to the removal of nitrogen and phosphorus from wastewater wherein the phosphate is removed using microorganisms in aerobic tanks which absorb the phosphorus released from denitrified wastewater. See also U.S. Pat. No. 6,113,788 to Park et al; U.S. Pat. No. 6,117,323 to Haggerty; U.S. Pat. No. 6,139,743 to Park et al.

U.S. Pat. No. 6,893,567 (Vanotti et al.) is directed to a system for treating wastewater to at least reduce the amount of ammonia and phosphorus, as well as reducing the presence of infectious microorganisms by using a nitrification step to reduce or eliminate carbonate and ammonium buffers contained in the wastewater, precipitating phosphorus using an alkaline earth metal and increasing the pH of the wastewater. See also U.S. Pat. No. 7,674,379 (Vanotti et al.).

Szogi et al. developed a treatment process to recover nutrients from animal wastes. The process extracts phosphorus from solid animal wastes such as, for example, poultry litter or animal manure solids (Szogi et al., U.S. Pat. No. 8,673,046, Mar. 18, 2014). The first step of this process extracts phosphorus from solid animal wastes using mineral or organic acids. In the second step, phosphorus is recovered by the addition of liquid lime and an organic poly-electrolyte to the liquid extract to form a calcium-containing phosphorus precipitate.

While various systems have been developed for removing $NH_3$ and phosphorus from wastewater, there still remains a need in the art for different abatement systems that removes both $NH_3$ and phosphorus and recovers both in a concentrated pure form. The present invention, different from the related art,—provides such systems 20 using hydrophobic gas-permeable membranes and circulated stripping solutions to produce an effluent that can be treated with phosphorus precipitating compounds to recover up to 100% of the phosphorus present in wastewater.

SUMMARY OF THE INVENTION

It is therefore an object of the present invention to provide a system 20 for at least reducing levels of $NH_3$ and phosphorus from ammonia- and phosphorus-containing liquid effluents and recovering nitrogen and phosphorus in a purified and concentrated form.

Another object of the present invention is to remove phosphorus using systems 20 that do not require large capacity airflow handling systems.

A still further object of the present invention is to provide a system 20 for at least reducing the levels of $NH_3$ and phosphorus from ammonia- and phosphorus-containing effluents using systems 20 that captures $NH_3$ in a circulated stripping solution in membrane manifold 15 and precipitates phosphorus by the addition of a phosphorus precipitating agent to liquid effluent that has reduced levels of $NH_3$ and a high pH caused by low-rate aeration of the effluent.

A still further object of the present invention is to provide a system 20 for at least reducing the levels of $NH_3$ and phosphorus from ammonia- and phosphorus-containing effluents using systems 20 that captures $NH_3$ in a circulated stripping solution in membrane manifold 15 and precipitates phosphorus by the addition of $MgCl_2$ to liquid effluent in said anaerobic digester 23.

Further objects and advantages of the invention will become apparent from the following description.

DETAILED DESCRIPTION

Figure 1:
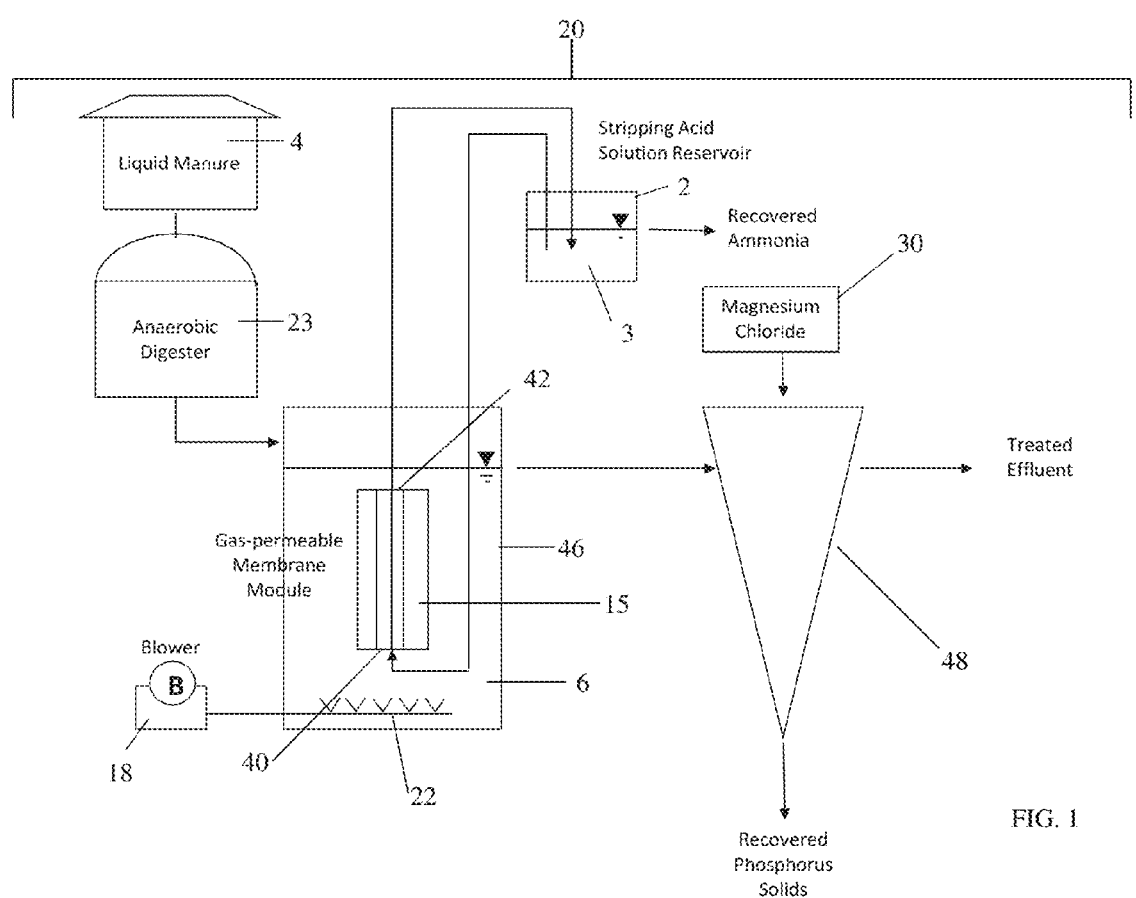
FIG. 1 is a schematic diagram of a nutrient recovery system 20 used to remove and recover ammonia and phosphorus from an anaerobic digester 23 that is used to treat liquid manure for biogas production. Shown is a liquid manure reservoir 4, anaerobic digester 23, a nutrient separation tank 46 having a gas-permeable membrane module 15 wherein said module 15 has an acid solution entrance opening 40 and an exit opening 42, tank 46 also includes liquid effluent 6 from anaerobic digester 23. Tank 46 also includes air diffuser 22 that is operatively connected to blower 18 to provide a low-rate of aeration of tank 46. Nutrient recovery is enhanced by acid addition from stripping acid solution reservoir 2 containing acid solution 3. Liquid effluent from nutrient separation tank 46 enters solid separation tank 48. Magnesium chloride from reservoir 30 is added to tank 48 to precipitate phosphorus.

The present invention uses gas-permeable membrane technology disclosed in U.S. Pat. No. 9,005,333 (Apr. 14, 2015; herein incorporated by reference in its entirety) that captures and recovers the ammonia from wastewater. The ammonia removal is done with low-rate aeration in the reactors that increases the pH of the liquid and accelerates the rate of passage of $NH_3$ through submerged microporous hydrophobic gas-permeable membrane manifold 15 (FIG. 1) and the capture of $NH_3$ in a circulated acidic solution with concomitant production of a concentrated ammonium salt. Once $NH_3$ is in contact with the acidic solution it reacts with free protons ($H^+$) to form non-volatile ammonium ($NH_4^+$) salt, which are retained and concentrated in the acidic solution. A Phosphorus precipitating compound, such as for example, magnesium chloride is added to the wastewater effluent prior to or after NH3 removal. In one embodiment, effluent from tank 46 flows to tank 48. $MgCl_2$ is added to tank 48 and phosphorus precipitates to form phosphorus solids that are recovered from the treated effluent (FIG. 1).

Figure 2:
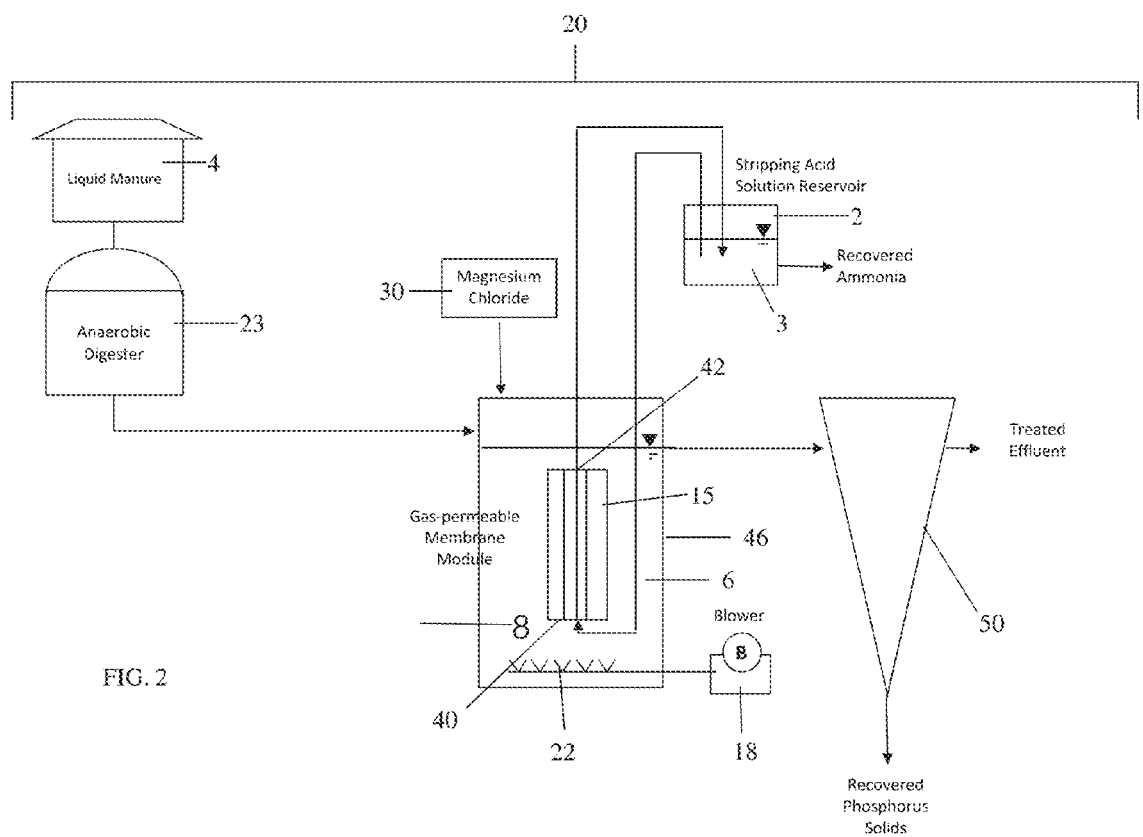
FIG. 2 is a schematic diagram of a nutrient recovery system 20 used to remove and recover ammonia and phosphorus from an anaerobic digester 23 that is used to treat liquid manure for biogas production by eliminating the toxicity of high ammonia concentration to methanogens. Shown is liquid manure reservoir 4, anaerobic digester 23, a nutrient separation tank 46 having gas-permeable membrane module 15 wherein said module 15 has an acid solution entrance opening 40 and an exit opening 42, tank 46 also includes liquid effluent 6 from anaerobic digester 23. Tank 46 also includes air diffuser 22 that is operatively connected to blower 18 to provide a low-rate of aeration of tank 46. Nutrient recovery is enhanced by acid addition from stripping acid solution reservoir 2 containing acid solution 3. Magnesium chloride reservoir 30 containing a magnesium chloride solution is in fluid communication with tank 46 and stripping acid solution reservoir 2 is in fluid communication with tank 46. Liquid effluent from nutrient separation tank 46 enters solid separation tank 48 where precipitated phosphorus is separated from treated effluent.

In the second embodiment, the phosphorus precipitating compound is added to tank 46 and effluent containing precipitated phosphorus flows to tank 48 where the phosphorus solids are recovered from the treated effluent (FIG. 2).

Figure 8:
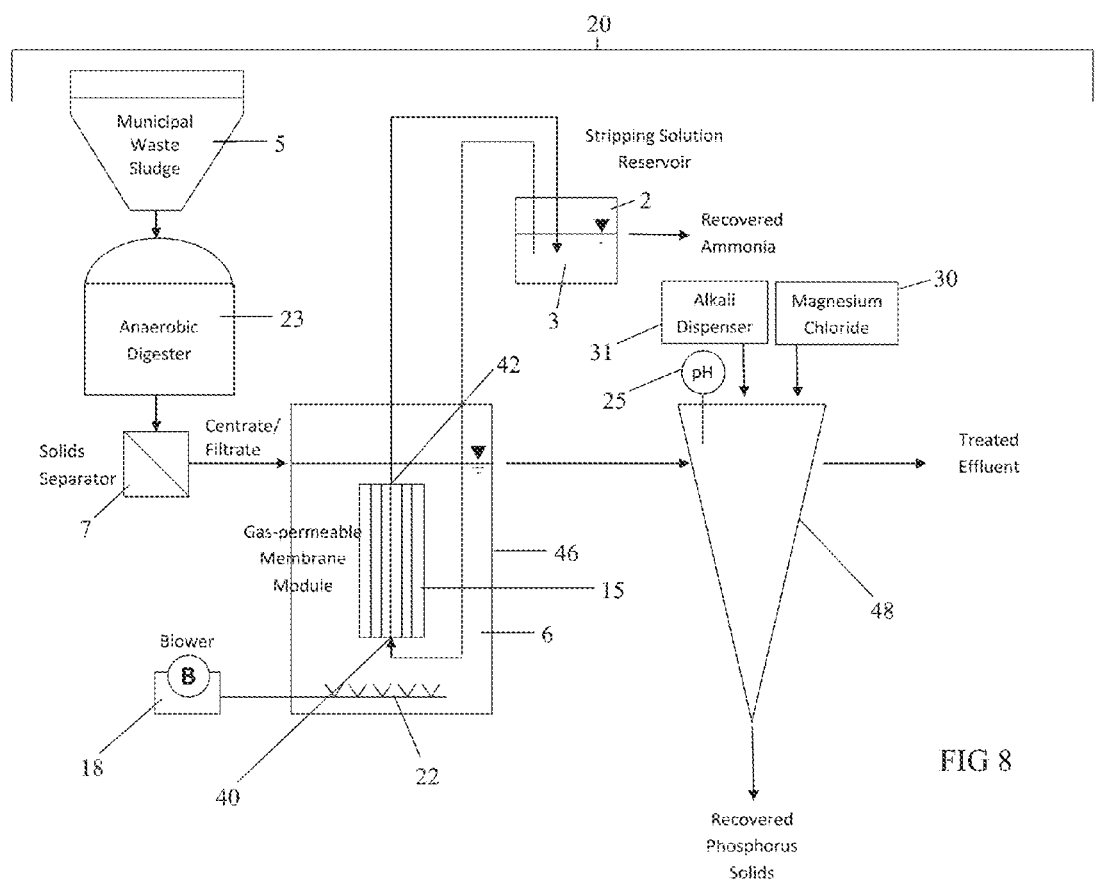
FIG. 8 is a schematic drawing of a nutrient recovery system 20 used to remove and recover ammonia and phosphorus from a municipal effluent from an anaerobic digester 23 that is used to treat waste sludge 5 in municipal sewerage plants. Shown is a waste sludge tank 5, anaerobic digester 23, a liquid-solids separator 7 producing a filtrate/centrate effluent rich in soluble nitrogen and phosphorus, a nutrient separation tank 46 having a gas-permeable membrane module 15 wherein said module 15 has an acid solution entrance opening 40 and an exit opening 42, tank 46 also includes liquid effluent 6 from anaerobic digester 23. Nutrient recovery is enhanced by acid addition from stripping acid solution reservoir 2 containing acid solution 3. Liquid effluent from nutrient separation tank 46 enters phosphorus solid separation tank 48. Magnesium chloride from reservoir 30 and alkali from reservoir 31 are added to tank 48 to precipitate phosphorus. A pH meter/controller 25 is used to dosage alkali and adjust process of pH phosphorus precipitation.

In the third embodiment, the phosphorus precipitating compound is added to tank 48 and the precipitated phosphorus is recovered from tank 48 (FIG. 8).

Definitions

As used in the specification and claims the singular form "a", "an", and "the" include plural references unless the context clearly dictates otherwise. For example, the term "a membrane manifold" includes a plurality of membrane manifolds.

As used in the specification and claims, the terms "about" and "approximately" mean to be nearly the same as a referenced number or value. As used herein, the terms "about" and "approximately" should be generally understood to encompass ±10% of a specified amount, frequency or value. Further, all number expressing the quantities used the specification and claims, for example, concentrations, reaction conditions, time, temperature and yield, are modified by the term "approximately" unless otherwise indicated. As used herein, when a numerical range is given, both ends of the range are included.

The term substantial or substantially mean of real worth or importance, or considerable value. For example, a substantial increase or decrease means a change greater than 5% of the previous measured value.

For purposes of the present invention the recitation "low rate aeration" is defined as an aeration rate that is less than about 5% of the aeration rate used for biological ammonia removal/nitrification.

For purposes of the present invention, the term stripping solutions is defined as acids, such as organic acids including citric, oxalic, lactic, etc., for example; mineral acids including sulfuric, hydrochloric, nitric, phosphoric, for example; and mixtures of both mineral and organic acids and their precursors such as sodium bisulfate, sulfur, corn silage, molasses and carbohydrates and mixtures thereof. Approximately 1 normal acid solutions are preferred. Furthermore, stripping solutions can be water that is acidified by the fixation of gaseous carbon dioxide into the stripping water to form carbonic acid and further combination with gaseous ammonia to form ammonia bicarbonate.

Figure 9:
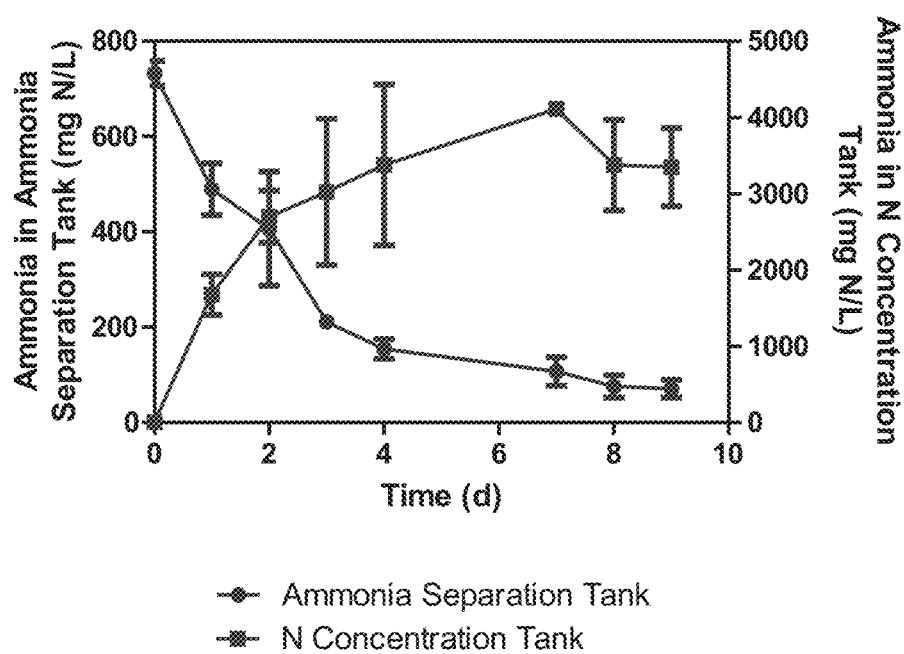
FIG. 9 is a graph showing recovery of ammonia from digested side stream municipal effluent by gas-permeable membrane module 15 with aeration of the module 15. The ammonia in the liquid effluent 6 contained in the ammonia concentration tank 46 was reduced and concentrated in the stripping acid 3 in the nitrogen concentration tank 2.
Figure 10:
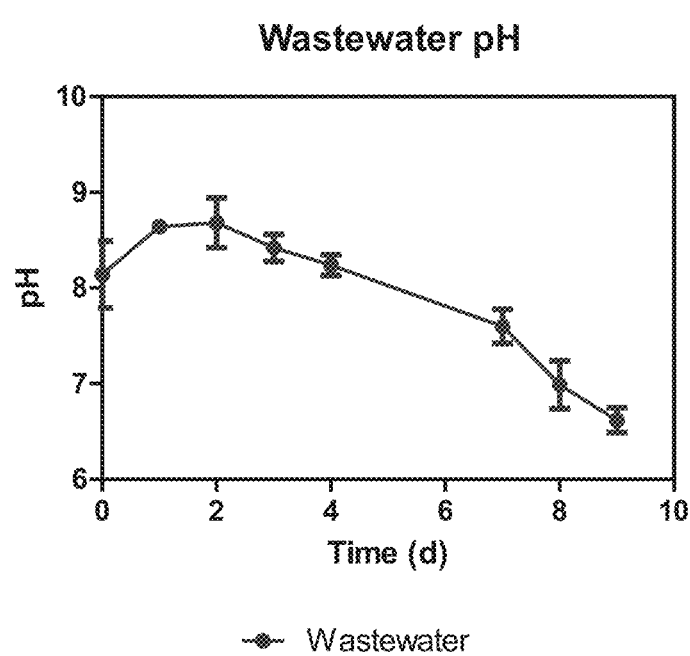
FIG. 10 is a graph showing changes in pH during ammonia recovery from digested side stream municipal effluent using gas-permeable membrane module 15 with aeration using embodiment 3 shown in FIG. 8. Low rate of aeration increased pH during the first 4 days and enhanced both alkalinity removal and ammonia recovery.
Figure 11:
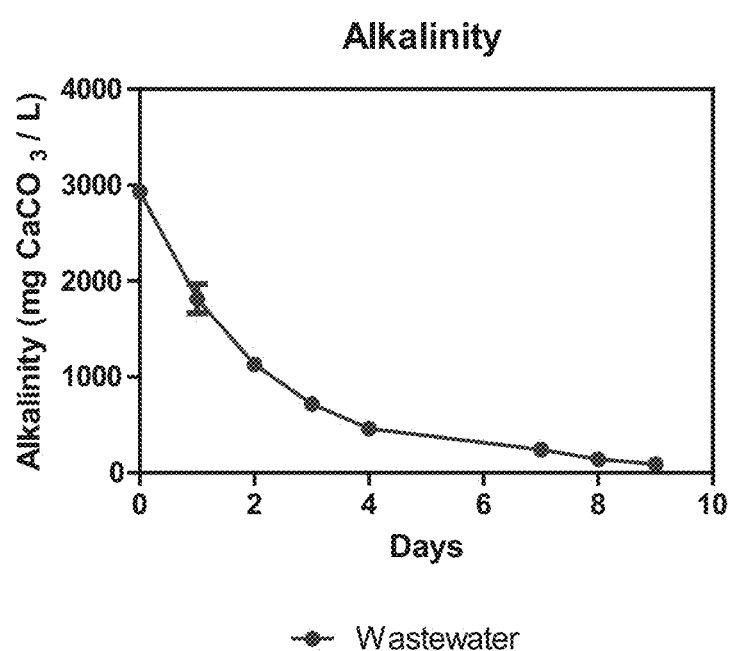
FIG. 11 is a graph showing destruction of alkalinity over time during ammonia recovery from digested municipal effluent using gas-permeable membrane module 15 with aeration using embodiment 3 shown in FIG. 8 using digested side stream municipal effluent in the James River wastewater treatment plant, Hampton Roads Sanitation District, Virginia.

For purposes of the present invention, a membrane manifold includes multiple membranes connected in parallel through a stripping solution splitter or in series through a connector (See U.S. Pat. No. 9,005,333, FIGS. 9A and 9B for example).

For purposes of the present invention the term liquid effluent is any liquid containing ammonia and phosphorus and includes water, municipal waste, livestock waste, manufacturing waste, etc.

For purposes of the present invention, the membrane assembly 15 functions as a passive getter for ammonia and as the ammonia is captured, production of more ammonia from non-volatile $NH_4$ occurs until at least 50% of the $NH_4$ is converted to $NH_3$.

For purposes of the present invention the phosphorus precipitating agent is any chemical that precipitates phosphorus in a system that captures ammonia and uses a low-rate aeration to control pH in wastewater. Examples of a phosphorus precipitating agent include, but are not limited to, $MgCl_2$, $Mg(OH)_2$, $Ca(OH)_2$, etc.

For purposes of the present invention the term stripping solution tank/ammonia concentrating reservoir 2 is defined as any size, non-reactive container for the storage of acid used in the present invention.

Description of the Invention

Modern animal production is an extremely sophisticated business and the management, treatment, purification, and appreciation of its by-products should also be so. As the practice of intensive production in enclosed areas grows, such as for example, stables, poultry houses, or pen facilities, there is an increasingly urgent need for effective and affordable alternatives for management of nutrient by-products.

The removal and recovery of $NH_3$ and phosphorus is a desirable feature because it can be exported off the farm which solves the problems of nitrogen and phosphorus surpluses in concentrated livestock production regions. The present invention uses gas-permeable membranes manifold 15 that is submerged in wastewater. As shown in FIGS. 1 and 2, the invention allows for the passage of gaseous $NH_3$ through microporous hydrophobic gas-permeable membranes in manifold 15 and its capture in a circulated acidic solution with concomitant production of a concentrated non-volatile ammonium salt. Once the $NH_3$ is in contact with the acidic solution it reacts with free protons ($H^+$) to form the non-volatile ammonium ($NH_4^+$) salt, which is retained and concentrated in the acidic solution.

The ammonia removal is done with low-rate aeration in the reactors that increases the pH of the liquid and accelerates the rate of passage of ammonia through the submerged gas-permeable membrane manifold and further concentration in an acid stripping solution. The effluent after ammonia treatment has a high pH of about greater than 9. The higher pH is the result of the destruction of the alkalinity with low aeration that strips the $CO_2$ and the conversion of $NH_4^+$ to $NH_3$ and removal of $NH_3$ thru the membrane. Phosphorus precipitating compounds such as for example, magnesium chloride, $MgCl_2$, is added to system either before or after ammonia removal.

In the first embodiment of the present invention, a phosphorus precipitating compound such as for example, $MgCl_2$ is added to the effluent after ammonia removal in tank 48 in amounts equivalent to or higher than the phosphorus concentration in the effluent on a concentration basis. The amount of phosphorus in the effluent can be determined using an on-line phosphorus analyzers (not shown) (FIG. 1). Alternatively, the phosphorus can be measured in the treated effluent and dosage of $MgCl_2$ adjusted in the process to meet a desired phosphorus concentration level. After rapid mixing using mechanical moving mixers or in-line static mixers known in the art, the phosphorus quickly precipitates as a solid. This precipitation is done without alkali or lime addition that is normally done to precipitate the phosphorous as magnesium or calcium phosphates, and it proceeds quickly as a result of the previous removal of the carbonate alkalinity, which interferes with phosphate precipitation. Mixing time is needed to dissolve the phosphorus precipitating agent in the effluent and varies with the mixing apparatus. After dissolution, reaction time is typically about 1 to 5 minutes but precise duration should be determined for specific cases. Visual inspection can be used since the reaction is normally complete when clear precipitate flocs are formed in the mixed liquid. Addition of alkali chemical to the process did not result in increased recovery relative to the present invention that does not use the alkali chemical. Phosphorus recovery in the precipitate was approximately 93-96%. The process produced high quality recovered phosphorus materials with approximately >90% plant available phosphorus as determined by the soluble citrate P analyses. High citrate soluble P means that the phosphorus product is mostly plant available, which is desirable for a fertilizer product because it does not need further treatment such as acidification used for rock phosphate in fertilizer mining. The recovered phosphorus material had very high phosphate and Mg content: approximately 46% $P_2O_5$ and approximately 17% Mg and with low concentration of N, approximately 1.8%; Ca, approximately 0.4%; and K, approximately 1.7%. As a comparison, phosphate rock mineral in the USA typically contains about 27.5 to 37.9% phosphorus in western fields and about 30.5 to 36.5% phosphorus in Florida fields. For purposes of the present invention, high-purity is defined to be at least about greater than about 15% $P_2O_5$. Flocculants, such as polyacrylamides (PAMS), especially anionic PAMS, are used to increase the flocculation of the phosphorus precipitate and improve its dewatering. The dewatered phosphorus can be used as a fertilizer.

In a second embodiment of the present invention, a phosphorus precipitating compound, such as for example, $MgCl_2$ is added to the digester effluent in tank 46, mixed quickly using in-line mixers, mechanical mixers 17, or by the action of aeration turbulence inside the tank 46 (FIG. 2) fitted with gas permeable membrane module 15. Low rate aeration is also used in the ammonia separation tank 46 to increase pH and enhance the capture and recovery of the ammonia and the formation of phosphorus solids at higher pH. The process is completed at the end of the ammonia extraction treatment. With a digester effluent containing approximately 2,400 mg $NH_3$/L, the process takes about 5 days. At that time, all the phosphate is in solid form and precipitated. It can be recovered at the bottom of the same tank 46 or in a contiguous settling tank 50 (FIG. 2). In tests, this process produced struvite phosphates, $NH_4MgPO_4 \cdot 6H_2O$, containing approximately 4.5% N, approximately 26.4% $P_2O_5$, and approximately 10% Mg. This product obtained compares with pure struvite containing approximately 5.7% N, approximately 29% $P_2O_5$, and approximately 9.9% Mg. The process provided quantitative recovery of the P in solid forms. For ammonia, the combined process recovered approximately 92%; about 3% was recovered in the struvite precipitate, and approximately 89% was recovered in the ammonia concentrate with the ammonia recovery module. Struvite formation is a widely used process for recovery of phosphate from wastewater streams implemented in several commercial processes. These commercial processes typically use $MgCl_2$ and NaOH or chemical combinations to add Mg and increase process pH to produce the struvite mineral containing the phosphorus. However, these commercial processes recover only about less than about 10% of the total nitrogen contained in the influent. The second configuration of the claimed invention uses low rate aeration without alkali addition to increase the pH that benefits both struvite formation and ammonia recovery and recovers most of the Nitrogen and Phosphorus as described above in marketable products.

In a third embodiment of the present invention, a phosphorus precipitating compound such as for example $MgCl_2$, is added to the effluent after ammonia removal in tank 48 (FIG. 8) in amounts equivalent to or higher than the phosphorus concentration in the effluent on a molar concentration basis. The amount of phosphorus in the effluent can be determined using an on-line phosphorus analyzer (not shown). Alternatively, the phosphorus can be measured in the treated effluent and dosage of $MgCl_2$ adjusted in the process to meet a desired phosphorus concentration level.

An alkali compound such as NaOH, is added to the effluent using a pH controller and mixer 25 to a pH in the range of approximately 8.9 to approximately 9.4, preferably approximately 9.2. After rapid mixing using mechanical moving mixers or in-line static mixers known in the art, the phosphorus quickly precipitates as a solid. This precipitation is done with substantially less alkali or lime addition that is normally done to precipitate the phosphorus as magnesium or calcium phosphates, and it proceeds quickly as a result of the previous removal of the ammonia and carbonate alkalinity in tank 48, which both interferes with phosphate precipitation and formation of high-grade phosphates. Mixing time is needed to dissolve the phosphorus precipitating agent in the effluent and varies with the mixing apparatus. After dissolution, reaction time is typically about 1 to 5 minutes but precise duration should be determined for specific cases. Visual inspection can be used since the reaction is normally complete when clear precipitate flocs are formed in the mixed liquid. Addition of alkali chemical to the process is recommended when the initial alkalinity concentration of the municipal side stream wastewater relative to the initial ammonia concentration is low. Low is defined by an alkalinity to ammonia concentration ratio lower than about 5. In these conditions, the N recovery pretreatment reduces pH below about 9.2 and supplementation of alkali to increase pH is needed. However, the amounts of alkali required in the present invention are substantially reduced by the effect of removing ammonia and alkalinity from the effluent during the N recovery pretreatment, prior to phosphorus precipitation. Phosphorus recovery in the precipitate was approximately 80-100%. The process produced high quality recovered phosphorus materials with approximately >90% plant available phosphorus as determined by the soluble citrate P analyses. High citrate soluble P means that the phosphorus product is mostly plant available, which is desirable for a fertilizer product because it does not need further treatment such as acidification used for rock phosphate in fertilizer mining. The recovered phosphorus material had very high phosphate and Mg content: approximately 43% $P_2O_5$ and approximately 1% Mg and with low concentration of N of approximately 2.7%; Ca is approximately 1.2%; and K is approximately 1.3%. As a comparison, phosphate rock mineral in the USA typically contains about 27.5 to 37.9% phosphorus in western fields and about 30.5 to about 36.5% phosphorus in Florida fields. For purposes of the present invention, high-purity is defined to be at least about greater than about 15% $P_2O_5$. Flocculants, such as polyacrylamides (PAMS), especially anionic PAMS, are used to increase the flocculation of the phosphorus precipitate and improve it dewatering. The dewatered phosphorus can be used as a fertilizer.

The following examples are intended only to further illustrate the invention and are not intended to limit the scope of the invention which is defined by the claims. Liquid swine manure and municipal wastewater and phosphorus precipitating compounds $MgCl_2$ and $Ca(OH)_2$ are used as a model to exemplify the system 20 of the present invention. System 20 can be used with any liquid effluent where $NH_3$ and phosphorus is produced and/or accumulated.

Example 1

In this example, $MgCl_2$ is added to phosphorus recovery tank 48 (FIG. 1) with or without NaOH alkali. Aerated tank 46 fitted with submerged gas-permeable membrane modules 15 was used to remove and recover ammonia from anaerobically digested swine wastewater form North Carolina farm operations. The gas permeable membrane module 15 was connected with a stripping solution reservoir 2 containing diluted 1N sulfuric acid 3. This acid solution was continuously recirculated through the membrane located in the tank 46 using a peristaltic pump (not shown). Low rate aeration was delivered to the bottom of tank 46 using an air pump 18 at a rate of approximately 0.12 L air/L manure/minute and air diffuser 22. The gas-permeable membrane in module 15 was tubular and made of e-PTFE material (Phillips Scientific, Inc., Rock Hill, S.C.) with a length of approximately 60 cm, outer diameter of approximately 10.25 mm, and wall thickness of approximately 0.75 mm. The e-PTFE membrane had an average pore size of approximately 2.5 µm and bubble point of approximately 210 kPa. The lid of tank 46 was not sealed, it had ports that allowed the air to escape. Nitrification inhibitor was added to the influent at approximately 22 mg/L dosage to ensure nitrification inhibition. Concentrated sulfuric acid was added to the stripping solution as needed to an end-point pH of about 1 when the pH of this solution increased above about 2 as result of active ammonia capture.

In a second step, the treated effluent from tank 46 was then transferred to phosphorus separation tank 48 where it was mixed with $MgCl_2$ to obtain a phosphorus precipitate and an effluent without phosphorus and ammonia. The rates of $MgCl_2$ applied were calculated based on the initial phosphorus concentration in the wastewater which was about 400 mg/L to obtain a Mg:P ratio of about 1. One of the phosphorus separation tanks 48 received alkali, approximately 10 mmol NaOH, after the addition of $MgCl_2$ to increase the pH to approximately 9.2. First the $MgCl_2$ treatment was added to the effluent, then NaOH alkali was added to the same vessel 48 while mixing with a stirrer (not shown). The chemicals were reacted with the effluent by mixing with a stirrer (not shown) for about one minute. After about a 0.5 hours gravity sedimentation period, the treated effluent in both treatments were sampled in the supernatant and analyzed for phosphate, ammonium, total phosphorus, and total nitrogen. The phosphorus precipitate was dewatered using glass fiber filters, dried, and characterized for total N using TKN acid digestion; P, Mg, Ca, and K using ICP digestion; and plant available phosphorus using citrate soluble P. Mass balances were conducted to calculate recoveries of nitrogen and phosphorus by measuring flows and concentrations in the inflow and the outputs of system 20. All experiments were duplicated. The entire process was performed at room temperature of approximately 25 degrees C.

The effluent after ammonia treatment had a high pH of approximately 9.3 as a result of the destruction of the alkalinity by aeration that strips $CO_2$ and the conversion of $NH_4 \rightarrow NH_3 + H^+$ and removal of $NH_3$ thru the membrane. After rapid mixing with the $MgCl_2$, the phosphorus quickly precipitated as a solid. Precipitate flocs were visible. Phosphorus mass recovery in the phosphorus precipitate was approximately 93% in the treatment that received only $MgCl_2$ and 96% in the treatment that received $MgCl_2$ and alkali NaOH. The process produced high quality phosphorus materials with very high phosphate and Mg content: approximately 46% $P_2O_5$ and approximately 16% Mg, and with low concentration of N, approximately 1.8%; Ca, approximately 0.4%; and K, approximately 1.7%. The plant available phosphorus material was also high, approximately 99%.

Results are shown in Tables 1-4.

TABLE 1

Changes in concentrations and mass balances for nitrogen (N) and phosphorus (P) using $MgCl_2$ and without NaOH.

| Nutrient | Influent Concentration mg/L | Effluent Concentration mg/L | Mass Inflow Initial Manure | Mass Outflow Recovered Solid | Recovered by Membrane mg (% of initial) | Effluent | Unaccounted | Total Recovery |
|---|---|---|---|---|---|---|---|---|
| N | 2295 | 574 | 3443 (100%) | 15 (0.44%) | 2180 (63.32%) | 861 (25.01%) | 387 (11.24%) | 2195 (63.8%) |
| P | 446 | 21.4 | 668 (100%) | 623 (93.23%) | 0 (0%) | 32 (4.81%) | 13 (1.95%) | 623 (93.23%) |

16.45 mmol/L Mg added as MgCl2
Initial pH = 8.36; pH of effluent from N removal tank = 9.33; pH after MgCl2 addition = 8.45

TABLE 2

Composition of Recovered Solid in a system using $MgCl_2$ and without NaOH
Composition of Recovered Solid

| N | P ($P_2O_5$) | Mg | Ca | K | Plant Available P (Citrate soluble) |
|---|---|---|---|---|---|
| | | | % | | |
| 1.78 | 20.2 (46.36) | 17.13 | 0.39 | 1.77 | 99.74 |

TABLE 3

Changes in concentrations and mass balances for nitrogen (N) and phosphorus (P) using $MgCl_2$ and NaOH.

| Nutrient | Influent Concentration mg/L | Effluent Concentration mg/L | Mass Inflow Initial Manure | Mass Outflow Recovered Solid | Recovered by Membrane mg (% of initial) | Effluent | Unaccounted | Total Recovery |
|---|---|---|---|---|---|---|---|---|
| N | 2295 | 537 | 3443 (100%) | 14 (0.41%) | 2180 (63.32%) | 806 (23.41%) | 443 (12.87%) | 2194 (63.7%) |
| P | 446 | 11.5 | 668 (100%) | 641 (95.95%) | 0 (0%) | 18 (2.69%) | 9 (1.34%) | 641 (96.0%) |

10 mmol/L NaOH added to increase pH to 9.2
16.45 mmol/L Mg added as MgCl2
Initial pH = 8.36; pH of effluent from N removal tank = 9.33; pH after MgCl2 addition = 8.49; pH after NaOH addition = 9.19

TABLE 4

Composition of Recovered Solid when using $MgCl_2$ with NaOH.
Composition of Recovered Solid

| N | P ($P_2O_5$) | Mg | Ca | K | Plant Available P (Citrate soluble) |
|---|---|---|---|---|---|
| | | | % | | |
| 1.68 | 20.55 (47.16) | 17.64 | 0.32 | 1.88 | 99.9 |

Example 2

In this example, $MgCl_2$ is added first to the digester effluent in tank 46, (FIG. 2) with or without NaOH. The $MgCl_2$ is added, mixed quickly using a mechanical mixer in an ammonia separation tank fitted with a gas-permeable membrane module 15. Tank 46 also acts as a phosphorus reaction tank. Low-rate aeration was used in the ammonia separation tank to increase pH and enhance the capture and recovery of the ammonia and the formation of phosphorus solids at the higher pH created by aeration. The process was completed at the end of the ammonia extraction that lasted approximately 5 days. At that time, all the phosphate was in solid form and precipitated. The phosphorus can be recovered at the bottom of the same tank 46 by formation of a quiet zone or interruption of the aeration. The phosphorus can also be recovered in a contiguous settling tank 50 as it was done this example (FIG. 2), Aerated tanks 46 fitted with submerged gas-permeable membrane modules 15 comprised the ammonia separation tank 46 to remove and recover ammonia from anaerobically digested swine wastewater. The high pH by aeration and $MgCl_2$ addition precipitated the phosphorus and formed suspended flocs of solid phosphorus. Therefore, in addition to ammonia separation, tank 46 performs phosphorus precipitation and formation of flocs that remain suspended by the turbulence action of the air bubbling. As described in Example 1 above, the gas-permeable membrane module 15 was connected with a stripping solution reservoir 2 containing diluted 1 N sulfuric acid 3 and the acid solution was recirculated in a closed-loop through the membrane located in module 15 in the tank 46 using a peristaltic pump (not shown). Low rate aeration 22 was also delivered to the bottom of ammonia separation tank 46 using an air pump 18 at a rate of approximately 0.12 L air/L manure/minute and air diffuser 22. The gas permeable membrane was tubular and made of ePTFE material (Phillips Scientific Inc., Rock Hill, S.C.) with the same characteristics as described above in Example 1. The lid of ammonia separation tank 46 was not sealed; it had ports that allowed the air to escape. Nitrification inhibitor [N-Serve (nitrapyrin was also added to the influent at 22 mg/L dosage to ensure nitrification inhibition. Concentrated sulfuric acid was added to the stripping solution 3 as needed to an end-point of pH of approximately 1 when the pH of this solution increased above approximately 2 as a result of active ammonia capture. The rates of $MgCl_2$ applied were calculated based on the initial phosphorus concentration in the wastewater, in this example approximately 400 mg/L, to obtain Mg:P ratio of about 1. There were three treatments tested to precipitate the phosphorus using the configuration shown in FIG. 2. One treatment received only $MgCl_2$ addition at approximately 16.4 mmol/L. Another treatment received $MgCl_2$ in the same dosage of approximately 16.4 mmol/L and a small amount of alkali, approximately 3 mmol/L of NaOH. The third treatment received $MgCl_2$ in the same dosage of approximately 16.4 mmol/L and a larger amount of alkali, approximately 117 mmol/L NaOH. The $MgCl_2$ was added first to the wastewater and then NaOH was added in the second and third treatment while mixing with a stirrer. The wastewater with mixed chemicals was reacted in the ammonia/phosphorus separation tank 46. The complete nutrient separation process was completed at the end of the ammonia extraction. The exact duration varies with the strength of the wastewater. The treatment time for the swine digester effluents containing approximately 2,400 mg $NH_3$/L was approximately 5 days. At that time, all the phosphate was in solid form and precipitated. After about 0.5 hour gravity sedimentation period, the treated water was sampled in the supernatant and analyzed for total N by TKN acid digestion; total P, Mg, Ca, and K by ICP digestion, and plant available P by citrate soluble P. Mass balances were conducted to calculate recoveries of nitrogen and phosphorus by measuring flows and concentrations in the inflow and the outputs of the system. All experiments were duplicated. The entire process was performed at room temperature of about 25 degrees C.

With $MgCl_2$ alone, no alkali addition, struvite phosphates, $NH_4MgPO_4 \cdot 6H_2O$, were produced containing approximately 4.5% N; approximately 26.4% $P_2O_5$, and approximately 9.9% Mg. The process provided quantitative recovery of the P in the solid form and yielded approximately 100% recovery. For ammonia, the combined process recovered approximately 91%; approximately 8% of the ammonia was recovered in the struvite precipitate and approximately 83% of the ammonia was recovered in the ammonia concentrate with the ammonia module 15. The initial pH of wastewater was approximately 8.4, after $MgCl_2$ addition, it decreased to approximately 7.9 and increased to approximately 9.5 after aeration. The struvite formation is a widely used process for recovery of phosphate from wastewater streams implemented in several commercial processes. These processes typically use $MgCl_2$ and NaOH or chemical combinations to add Mg and increase the process pH to produce struvite mineral containing P. However, these commercial processes recover only about <10% of the total nitrogen contained in the influent because all the N recovery is at the hands of the struvite formation that leaves about 90% of the N in the final effluent. In the process of the present invention, only about <3% of the ammonia remained in the final effluent with approximately 8% of the ammonia recovered in the struvite solids, and the majority of the ammonia, approximately 83%, being captured in the ammonia module 15, on a mass basis. The process of the invention uses low rate aeration without alkali to increase the pH that benefits both struvite formation and ammonia recovery. Most of the N and P are recovered in marketable products. The treatment with $MgCl_2$ plus addition of alkali NaOH resulted in a final pH after aeration about the same as the treatment without NaOH: about 9.6-9.7 and 9.5, respectively. In all cases, the total phosphorus recovery efficiency in the phosphorus precipitate were high, approximately >99%, as well as the total N recovery efficiency of approximately >88%. In the process receiving $MgCl_2$ with 3 mmol NaOH added, Mg phosphates were produced containing approximately 2.9% N, approximately 28.6% $P_2O_5$ with approximately 98.4% plant available, and approximately 19% Mg. In the process using $MgCl_2$ with 117 mmol NaOH added produced Mg phosphates containing approximately 2.2% N, approximately 37.2% $P_2O_5$ of which approximately 98.9% is plant available, and approximately 14% Mg.

Results are shown in Tables 5-10 below.

TABLE 5

Changes in concentration and mass balances for nitrogen (N) and phosphorus (P) using approximately 16.45 mmol/L $MgCl_2$ and approximately 117 mmol/L NaOH.

| Nutrient | Influent 16.45 mmol/L Concentration mg/L | Effluent Concentration mg/L | Mass Inflow Initial Manure | Mass Outflow Recovered Solid | Recovered by Membrane | Effluent | Unaccounted | Total Recovery |
|---|---|---|---|---|---|---|---|---|
| N | 2354 | 163 | 3531 (100%) | 102 (2.88%) | 3154 (89.32%) | 245 (6.94%) | 30 (0.85%) | 3256 (92.2%) |
| P | 446 | 40.8 | 668 (100%) | 749 (112.1%) | 0 (0%) | 61.2 (9.16%) | 0 (0%) | 749 (112.1%) |

Initial pH = 8.36; pH after $MgCl_2$ addition = 7.87; pH after NaOH addition = 9.15; pH after aeration = 9.69

TABLE 6

Composition of recovered solid using approximately 16.45 mmol/L MgCl₂ and approximately 117 mmol/L NaOH.
Composition of Recovered Solid

| N | P (P₂O₅) | Mg | Ca % | K | Plant Available P (Citrate soluble) |
|---|---|---|---|---|---|
| 2.20 | 16.22 (37.23) | 14.06 | 3.00 | 5.41 | 98.86 |

TABLE 7

Changes in concentration and mass balances for nitrogen (N) and phosphorus (P) using approximately 16.45 mmol/L MgCl₂ and approximately 2.67 mmol/L NaOH.

| | | | Mass Inflow | | Mass Outflow | | | |
|---|---|---|---|---|---|---|---|---|
| Nutrient | Influent Concentration | Effluent Concentration | Initial Manure | Recovered Solid | Recovered by Membrane | Effluent | Unaccounted | Total Recovery |
| | mg/L | | | | mg (% of initial) | | | |
| N | 2354 | 157 | 3531 (100%) | 155 (4.38%) | 2952 (83.60%) | 236 (6.68%) | 188 (5.32%) | 3107 (88.0%) |
| P | 446 | 25.5 | 668 (100%) | 661 (98.95%) | 0 (0%) | 38 (5.69%) | 0 (0%) | 661 (98.95%) |

Initial pH = 8.36; pH after MgCl₂ addition = 8.19; pH after NaOH addition = 8.20; pH after aeration = 9.56

TABLE 8

Composition of recovered solid using approximately 16.45 mmol/L MgCl₂ and approximately 2.67 mmol/L NaOH.
Composition of Recovered Solid

| N | P (P₂O₅) | Mg | Ca % | K | Plant Available P (Citrate soluble) |
|---|---|---|---|---|---|
| 2.93 | 12.47 (28.62) | 19.03 | 5.00 | 3.58 | 98.40 |

TABLE 9

Table 9. Changes in concentration and mass balances for nitrogen (N) and phosphorus (P) using approximately 16.45 mmol/L MgCl₂ only.

| | | | Mass Inflow | | Mass Outflow | | | |
|---|---|---|---|---|---|---|---|---|
| Nutrient | Influent Concentration | Effluent Concentration | Initial Manure | Recovered Solid | Recovered by Membrane | Effluent | Unaccounted | Total Recovery |
| | mg/L | | | | mg (% of initial) | | | |
| TN | 2354 | 69.2 | 3531 (100%) | 271 (7.67%) | 2923 (83.1%) | 104 (2.93%) | 228 (6.45%) | 3194 (90.5%) |
| TP | 446 | 23.5 | 668 (100%) | 697 (104.3%) | 0 (0%) | 35 (5.27%) | 0 (0%) | 697 (104.3%) |

TABLE 10

Composition of recovered solid using approximately 16.45 mmol/L MgCl₂ Only.
Composition of Recovered Solid

| N | P (P₂O₅) | Mg | Ca % | K | Plant Available P (Citrate soluble) |
|---|---|---|---|---|---|
| 4.48 | 11.50 (26.39) | 10.02 | 2.00 | 1.65 | 99.00 |

Example 3

This example illustrates how the low aeration rate in the ammonium separation tank 46 increases the pH and enhances both the N recovery and the P recovery. Aeration versus no aeration of tank 46 is compared using the system shown in FIG. 1 where the MgCl₂ is added to phosphorus precipitation and recovery tank 48. The system configuration is the same as described above in Example 1. The wastewater used was anaerobically digested swine wastewater from two farm operations in North Carolina.

Table 11 shows mass balances for recovery of ammonia from digested swine effluent in two farms by gas-permeable membrane module 15 with and without aeration of module 15 (FIG. 1). The process effectively recovered ammonia from wastewater. The low rate aeration treatment shortened treatment time about 5 times, from about 25 days to about 5 days. Ammonia was recovered with approximately 96-98% efficiency with the aeration treatment and with approximately 76-95% without aeration. Low rate aeration consistently increased wastewater pH more than about 1 unit and enhanced both alkalinity removal and ammonia recovery. Higher pH and lower alkalinity are factors known to influence phosphorus precipitation with magnesium and calcium compounds. The aeration reacted with the natural alkalinity which released OH− and increased manure pH above 9. This pH increase promoted gaseous NH3 release from the manure and rapid permeation through the submerged membrane with high, approximately >96%, recovery of the N.

TABLE 11

Mass balances for recovery of ammonia from digested swine effluent in two farms by gas-permeable membrane module with and without aeration of the module (Configuration 1, FIG. 1). The low rate aeration increased the process pH and enhanced ammonia recovery (a).

| | Time | Time to maximum recovery (days) | Initial $NH_4^+$ in Manure | Remaining $NH_4^+$ in Manure | $NH_4$—N lost from Manure (b) (mgN) | $NH_4$—N Volatilized in air | $NH_4$—N recovered | $NH_4$—N removal efficiency (c) (%) | $NH_4$—N recovery efficiency (d) | Maximum $NH_4$ recovery rate (mg $NH_4$—N/day) | Average $NH_4$ recovery rate (e) |
|---|---|---|---|---|---|---|---|---|---|---|---|
| Farm 1 Aerated | 5 | 4 | 3133 (151) | 96 (29) | 3037 | 58 | 2979 (2) | 97 | 98 | 1621 | 596 |
| Farm 1 Non Aerated | 25 | 25 | 3157 (132) | 71 (19) | 3086 | 150 | 2936 (40) | 98 | 95 | 424 | 117 |
| Farm 2 Aerated | 5 | 5 | 2332 (28) | 34 (8) | 2298 | 94 | 2204 (44) | 99 | 96 | 768 | 441 |
| Farm 2 Non Aerated | 28 | 24 | 2062 (56) | 155 (72) | 1907 | 465 | 1442 (83) | 92 | 76 | 538 | 52 |

Figure 3:
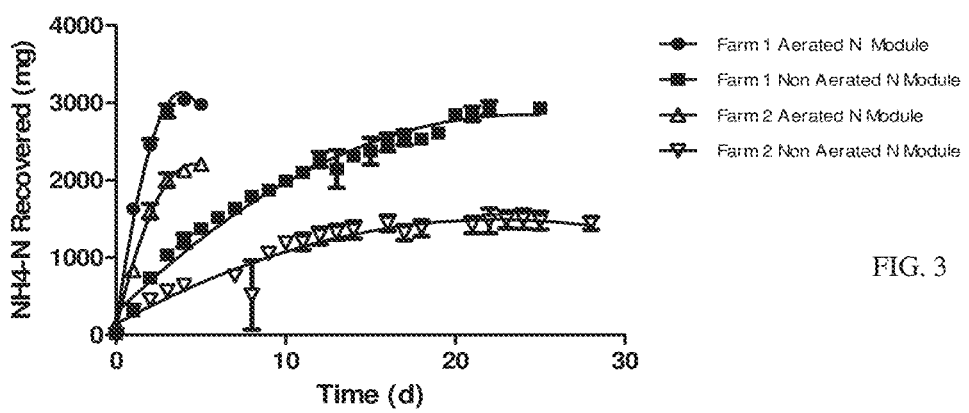
FIG. 3 is a graph showing recovery of ammonia from digested swine effluent in two farms by gas-permeable membrane module 15 with and without aeration of the module 15. The low rate of aeration increased the process of pH and enhanced ammonia recovery.
Figure 4:
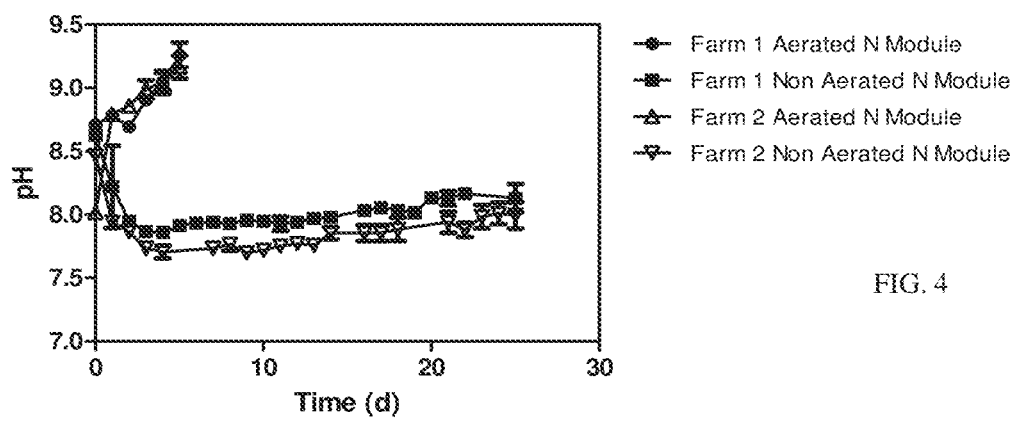
FIG. 4 is a graph showing changes in pH during ammonia recovery from digested effluent using gas-permeable membrane module 15 with and without aeration using embodiment 1 shown in FIG. 1. Low rate of aeration increased pH and enhanced both alkalinity removal and ammonia recovery.
Figure 5:
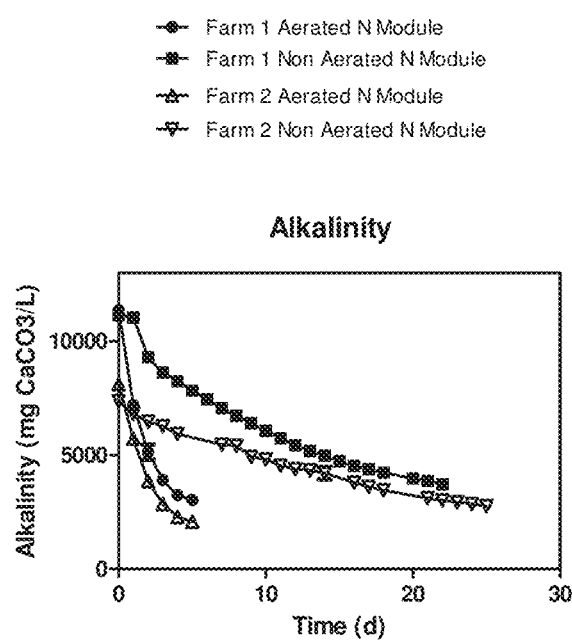
FIG. 5 is a graph showing alkalinity over time during ammonia recovery from digested effluent using gas-permeable membrane module 15 with and without aeration using embodiment 1 shown in FIG. 1 using digested swine effluent from 2 farms.

(a). 1.5 L manure in a 2 L vessel, using 250 mL 1N $H_2SO_4$ of acidic solution in the concentrator tank (recirculation rate of 4 mL/min). Low rate aeration is 180 mL/min (0.12 L air/L manure/minute. Data are average and standard deviation of duplicate reactors
(b). $NH_4^+$ lost from manure = initial $NH_4^+$ in manure − remaining $NH_4^+$ in manure
(c). $NH_4^+$ removal efficiency = ($NH_4^+$ lost from manure/initial $NH_4^+$ in manure) × 100
(d). $NH_4^+$ recovery efficiency = ($NH_4^+$ recovered in the acidic solution/$NH_4^+$ lost from manure) × 100
(e). Average $NH_4$ recovery rate = $NH_4$—N lost from manure/days in experiment See also FIGS. 3-5 for results showing ammonia recovered by stripping solution reservoir (FIG. 5), Manure pH over time (FIG. 4), and alkalinity over time (FIG. 5).

Example 4

This example illustrates the use of other phosphorus precipitating agents, such as $Mg(OH)_2$ and $Ca(OH)_2$ (hydrated lime), that can be used in the present invention to recover phosphorus in conjunction with the ammonia separation and recovery. System 20 includes ammonium separation tank 46, N concentration tank 2, and phosphorus separation tank 48 which were constructed and operated the same as described in Example 1, using the same wastewater influent. The only difference with Example 1 is that in step 2, hydrated lime ($Ca(OH)_2$ was used as precipitating agent instead of $MgCl_2$. The wastewater influent contained an ammonia ($NH_4^+$) concentration of 2216 mg N/L and a phosphate concentration of 15 mmol P/L. The $Ca(OH)_2$ was applied at rates of approximately 10, 20, 40 and 80 mmol/L and the corresponding Ca:P molar ratios were approximately 0.67, 1.33, 2.67, and 5.33.

In the nitrogen capture and recovery step, the ammonia concentration was reduced from approximately 2,216 to 55 mg N/L (98%) and recovered in the stripping reservoir 2. The treated effluent from the ammonia separation tank 46 had high pH of approximately 9.5±0.2 as a result of the destruction of the alkalinity by aeration that strips the $CO_2$ and the conversion of $NH_4 \rightarrow NH_3 + H^+$ and removal of $NH_3$ thru the membrane (not shown). After rapid mixing with the $Ca(OH)_2$, the phosphorus quickly precipitated as a solid. Precipitate flocs were whitish in color and visible. The phosphorus removal was low, approximately 7-9%, with Ca:P molar ratios of approximately 0.77 and 1.33. The system responded to higher lime rates. At Ca:P ratios of approximately 2.67 and 5.33 the P removal was increased to approximately 45% and 68%, respectively. Since in all treatments the pH was higher, approximately >10, than the pH needed to optimize precipitation of soluble phosphorus using $Ca(OH)_2$, it is concluded that the limitation in the example was the amount of Ca available and not the pH, which was already high before lime application. Therefore, the process pH is not useful to optimize chemical application and the chemical dosage should be based on amount of phosphate in the liquid. This concentration can be determined using on-line phosphate analyzers (i.e. Phosphax Analyzer, Hach Company, Loveland, Colo.) or rapid colorimetric tests kits for phosphate (Hach Company, Loveland, Colo.). Alternatively, the phosphorus can be measured in the treated effluent and dosage of lime adjusted in the process to meet a desired phosphorus concentration level.

Figure 6:
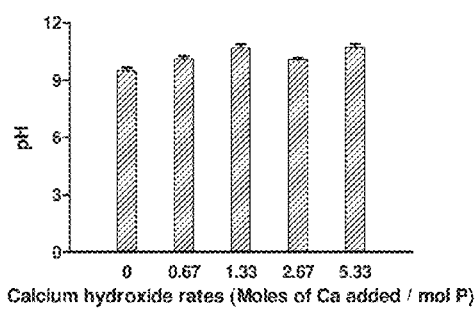
FIG. 6 is a graph showing pH of effluent when treated with different concentrations of the phosphorus precipitating agent calcium hydroxide.
Figure 7:
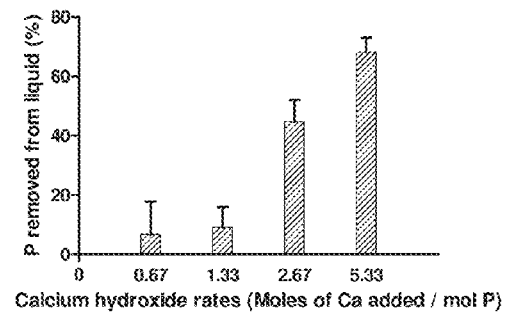
FIG. 7 is a graph showing percent phosphorus removal from effluent treated with different concentrations of the phosphorus precipitating agent calcium hydroxide.

Results are shown in FIGS. 6 and 7.

Example 5

In this example, $MgCl_2$, is added to phosphorus recovery tank 48 with alkali NaOH using the third embodiment described above (FIG. 8). Aerated tanks 46 fitted with submerged membrane modules 15 was used to remove and recover ammonia from side stream wastewater collected from James River municipal plant that is part of the Hampton Roads Sanitation District, Virginia. The side stream wastewater was a centrate effluent from waste sludge that was subjected to anaerobic digestion 23 and solids separation 7. The gas permeable membrane module 15 was connected with a stripping solution reservoir 2 containing diluted 1N sulfuric acid 3. This acid solution was continuously recirculated through the membrane located in the tank 46 using a peristaltic pump (not shown). Low rate aeration was delivered to the bottom of tank 46 using an air pump 18 at a rate of approximately 0.12 L air/L manure/minute and air diffuser 22. The gas-permeable membrane in module 15 was tubular and made of e-PTFE material (Phillips Scientific, Inc., Rock Hill, S.C.) with a length of approximately 60 cm, outer diameter of approximately 10.25 mm, and wall thickness of approximately 0.75 mm. The e-PTFE membrane had an average pore size of approximately 2.5 μm and bubble point of approximately 210 kPa. The lid of tank 46 was not sealed, it had ports that allowed the air to escape. Nitrification inhibitor was added to the influent at approximately 22 mg/L dosage to ensure nitrification inhibition. Concentrated sulfuric acid was added to the stripping solution as needed to an end-point pH of about 1 when the pH of this solution increased above about 2 as result of active ammonia capture. In a second step, the treated effluent from tank 46 was then transferred to phosphorus separation tank 48 where it was mixed with $MgCl_2$ and NaOH to obtain a phosphorus precipitate and an effluent without phosphorus and ammonia. The rates of $MgCl_2$ applied were calculated based on the initial phosphorus concentration in the wastewater which was about 140 mg/L to obtain a Mg:P ratio of about 1.2:1. Alkali NaOH was applied to reach an end-point pH of 9.2.

Three cases were evaluated using this configuration with municipal wastewater. A fourth case was a control treatment that precipitated the phosphorus with $MgCl_2$ and NaOH without previous N recovery module or aeration. All cases were tested using the same municipal wastewater. In case #1, the N recovery was done during 3 days before the phosphorus precipitation step (Tables 12-13). In case #2, the N recovery was done during 9 days before the phosphorus precipitation step (Tables 14-15 and FIGS. 9-12). Both cases #1 and #2 were repeated without alkali addition (Table 16). In case #3, the N recovery was also done during 9 days, but the initial effluent (before N recovery) was supplemented with 1000 mg/L of $KHCO_3$ (Tables 17-18). In case #4 (Control), the P precipitation was done directly in the side-stream effluent without receiving previous N recovery treatment (Tables 19-20).

337-74W/B). Phosphorus, Mg, Ca and K in the solids was determined using nitric acid digestion and ICP analysis. Plant available phosphorus in the solids was determined using citrate soluble P. Mass balances were conducted to calculate recoveries of nitrogen and phosphorus by measuring flows and concentrations in the inflow and the outputs of system 20. All experiments were duplicated. The entire process was performed at room temperature of approximately 25 degrees C.

In case #1, the effluent after ammonia treatment had a high pH of approximately 8.5 as a result of the destruction of the alkalinity by aeration that strips $CO_2$ and the conversion of $NH_4 \rightarrow NH_3+H^+$ and removal of $NH_3$ thru the membrane. After addition of small amounts of NaOH (5 mmol/L) to increase pH to 9.2 and rapid mixing with the $MgCl_2$, the phosphorus quickly precipitated as a solid. Precipitate flocs were visible. System 20 removed 83.2% of N and 96.3% of P. The percentage of nutrient recovered divided by nutrient removed was 112.0% and 82.4% for N and P respectively. Total Recovery (percentage of nutrient recovered divided by initial nutrient) was approximately 93% for N and 79% for P (Table 12). The process produced high quality phosphorus materials with very high phosphate and Mg content: approximately 44% $P_2O_5$ and approximately 14% Mg, and with low concentration of N, approximately 2.8%; Ca, approximately 0.9%; and K, approximately 0.7% (Table 13).

Results are shown in Tables 12 and 13 below.

TABLE 12

Changes in concentration and mass balances for nitrogen (N) and phosphorus (P) using $MgCl_2$ and NaOH. Municipal Wastewater Case 1.

| Nutrient | Influent Concentration mg/L | Effluent Concentration mg/L | Mass Inflow Initial Manure | Mass Outflow | | | | |
|---|---|---|---|---|---|---|---|---|
| | | | | Recovered Solid | Recovered by Membrane mg (% of initial) | Effluent | Unaccounted | Total Recovery |
| N | 731 | 123 | 1097 (100%) | 26 (2.37%) | 993 (90.52%) | 185 (16.86%) | 0 (0%) | 1019 (92.89%) |
| P | 147 | 6 | 221 (100%) | 175 (79.19%) | 0 (0%) | 9 (4.07%) | 37 (16.74%) | 175 (79.19%) |

N recovery during 3 days using gas-permeable membrane and aeration.
P precipitation: 5.42 mmol/L Mg added as $MgCl_2$ and 5 mmol/L NaOH added to increase pH to 9.2 end point.
Initial pH = 7.92; pH of effluent from N removal tank = 8.50; pH after $MgCl_2$ addition = 7.98; pH after NaOH addition = 9.29.

In all cases, the phosphorus separation tanks 48 received 5.42 mmol/L of $MgCl_2$ and alkali after the addition of $MgCl_2$ to increase the pH to an end-point of approximately 9.2. Cases 1-3 received approximately 3-10 mmol/L NaOH and the control (Case #4) approximately 33 mmol/L NaOH to reach the pH 9.2. First the $MgCl_2$ treatment was added to the effluent, then NaOH alkali was added to the same vessel 48 while mixing with a stirrer (not shown). The chemicals were reacted with the effluent by mixing with a stirrer (not shown) for about one minute. After about a 0.5 hours gravity sedimentation period, the treated effluent in all treatments were sampled in the supernatant and analyzed for ammonia ($NH_4$—N) and phosphorus. $NH_4$—N analysis of the influent, effluent and N recovered by the membrane was done by colorimetry (Standard Method 4500-NH3 G, Technicon Instruments Corp., 1977). Phosphorus content of the liquid samples was done by ICP analysis of nitric acid digestion extracts. The precipitated solids were separated from the supernatant and dried in an oven at 100 degrees C. Nitrogen in the solids was determined using Total Kjeldal N (TKN) determinations using acid digestion and the salicylate methods (Standard Method 4500-Norg D) adapted to digested extracts (Technicon Instruments Corp., Industrial Method

TABLE 13

Composition of recovered solid in a system using approximately 5.42 mmol/L $MgCl_2$ and approximately 5 mmol/L NaOH. Municipal Wastewater Case 1.
Composition of Recovered Solid

| N | P ($P_2O_5$) | Mg | Ca | K |
|---|---|---|---|---|
| | | % | | |
| 2.81 | 19.23 (44.13) | 13.57 | 0.92 | 0.70 |

In case #2, the N recovery period was extended to 9 days before P precipitation. Compared with case #1 (N recovery period=3 days), the extended N recovery period further reduced the ammonia concentration of the liquid effluent 6 leaving the ammonia separation tank 46. The effluent after N recovery treatment had a lower pH of approximately 6.59 as a result of the continued destruction of the alkalinity by aeration and the additional conversion of $NH_4 \rightarrow NH_3+H^+$ and removal of $NH_3$ thru the membrane. After addition of the $MgCl_2$ and small amounts of NaOH (10 mmol/L) to increase pH to 9.2, and rapid mixing, the phosphorus quickly precipitated as a solid. Precipitate with whitish flocs was visible. System 20 removed 91.8% of N and 85% of P. The percentage of nutrient recovered divided by nutrient removed was 85.1% and 125% for N and P respectively. Total Recovery (percentage of nutrient recovered divided by initial nutrient) was approximately 79% for N and 106% for P (Table 14). After N recovery, both ammonia and carbonate alkalinity concentrations were low, approximately 71 and 92 mg/L, respectively, compared with the initial side-stream wastewater containing approximately 730 mg $NH_4$—N/L and 2900 mg carbonate alkalinity/L. With low ammonia and alkalinity in the liquid, the P precipitation process produced high quality phosphorus materials with very high phosphate and Mg content: approximately 42% $P_2O_5$ and approximately 15% Mg, and with low concentration of N, approximately 2.6%; Ca, approximately 1.4%; and K, approximately 1.9%. The precipitated P was approximately 98% plant available (Table 15).

Addition of 5-10 mmol/L of NaOH to the side-stream municipal effluent after the N recovery step significantly increased both the amount of solids precipitated in the phosphorus separation tank 48 and amount of P recovered in the solids using precipitating agent $MgCl_2$ (Table 16).

The results are shown in Tables 14, 15 and 16 below.

Figure 12:
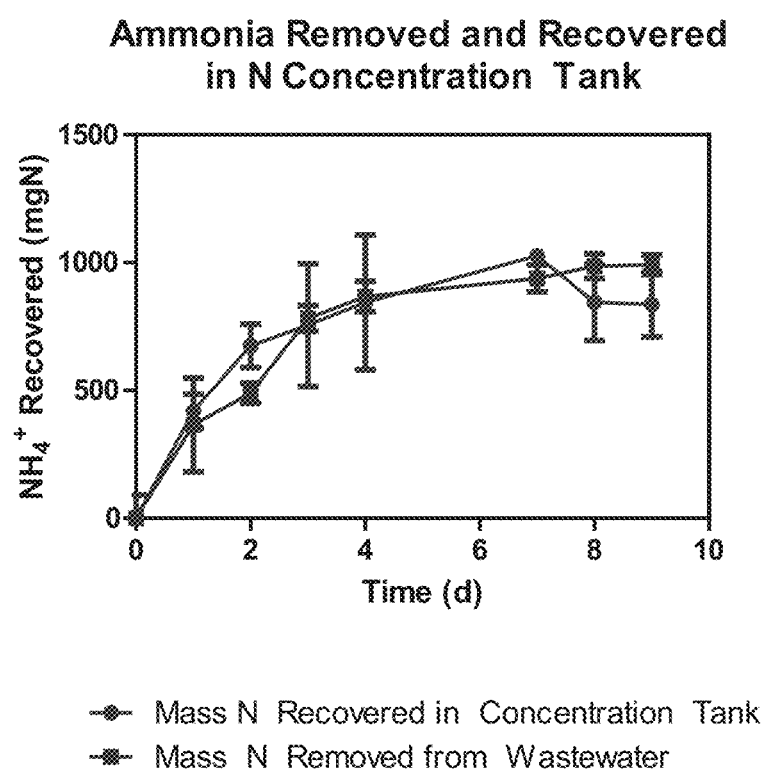
FIG. 12 is a graph showing mass nitrogen removal from municipal side stream effluent and corresponding mass recovery using gas-permeable membrane module 15 with aeration.

See also FIGS. 9-12 for results showing ammonia decrease in the ammonia separation tank and simultaneous ammonia recovered by stripping solution reservoir (FIG. 9), municipal wastewater pH over time (FIG. 10), and alkalinity destruction over time (FIG. 11), and mass N removed from wastewater and recovered in concentration tank 2 (FIGS. 8 and 12).

In case #3, the initial side stream effluent (before N recovery) was supplemented with the addition of 1000 mg/L of carbonate alkalinity using 2 g/L of potassium bicarbonate ($KHCO_3$)(Tables 16-17). The N recovery step was also done during 9 days as in case #2. The effluent after N recovery treatment had the lowest ammonia concentration (12 mg N/L) and a higher pH of approximately 8.5. After addition of small amounts of NaOH (5 mmol/L) to increase pH to 9.2 and rapid mixing with the $MgCl_2$, the phosphorus quickly precipitated as a solid. Precipitate flocs were visible. The addition of carbonate alkalinity to the wastewater improved N removal but decreased performance of the phosphorus recovery process, both in quantity and quality of the phosphorus product. System 20 removed 98.8% of N and 42.8%% of P. The percentage of nutrient recovered divided

TABLE 14

Changes in concentration and mass balances for nitrogen (N) and phosphorus (P) using $MgCl_2$ and NaOH. Municipal Wastewater Case 2.

| Nutrient | Influent Concentration mg/L | Effluent Concentration mg/L | Mass Inflow Initial Manure | Mass Outflow Recovered Solid | Mass Outflow Recovered by Membrane mg (% of initial) | Mass Outflow Effluent | Mass Outflow Unaccounted | Total Recovery |
|---|---|---|---|---|---|---|---|---|
| N | 733 | 60 | 1100 (100%) | 30 (2.73%) | 837 (76.09%) | 90 (8.18%) | 143 (13.00%) | 867 (78.82%) |
| P | 133 | 20 | 200 (100%) | 212 (106.00%) | 0 (0%) | 30 (15.00%) | 0 (0%) | 212 (106.00%) |

N recovery during 9 days using gas-permeable membrane module and aeration.
P precipitation: 5.42 mmol/L Mg added as $MgCl_2$ and 10 mmol/L NaOH added to increase pH to 9.2 end point.
Initial pH = 8.39; pH of effluent from N removal tank = 6.59; pH after MgCl2 addition = 6.35; pH after NaOH addition = 9.21.

TABLE 15

Composition of recovered solid in a system using approximately 5.42 mmol/L $MgCl_2$ and approximately 10 mmol/L NaOH. Municipal Wastewater Case 2.
Composition of Recovered Solid

| N | P ($P_2O_5$) | Mg | Ca | K | Plant Available P (Citrate soluble) |
|---|---|---|---|---|---|
| | | % | | | |
| 2.56 | 18.30 (41.99) | 14.59 | 1.41 | 1.88 | 98.36 | by nutrient removed was 85.8% and 113.6% for N and P respectively. Total Recovery (percentage of nutrient recovered divided by initial nutrient) was approximately 85% for N and 64% for P (Table 17). Case #3 with 1000 mg/L carbonate alkalinity supplementation reduced the phosphorus grade of the precipitated solid materials: approximately 27.4% $P_2O_5$ and approximately 13% Mg, and with low concentration of N, approximately 1.4%; Ca, approximately 2.2%; and K, approximately 8.7% (Table 18).

The results are shown in Tables 17 and 18 below.

TABLE 16

Amount of solids precipitated from 1.5 L of municipal wastewater using $MgCl_2$ with and without NaOH.

| N removal time (d) | Initial pH | pH after N removal | pH after MgCl2 addition | NaOH added (mmol/L) | Process pH | Amount of solids precipitated(g) | P recovered in solids (% of initial in wastewater) |
|---|---|---|---|---|---|---|---|
| 3 | 7.92 | 8.50 | 7.98 | 5 | 9.29 | 0.9090 | 79 |
| 3 | 7.92 | 8.50 | 7.98 | 0 | 7.98 | 0.4284 | 29 |
| 9 | 8.39 | 6.59 | 6.35 | 10 | 9.21 | 1.1601 | 106 |
| 9 | 8.39 | 6.59 | 6.34 | 0 | 6.35 | 0.1260 | 11 |

TABLE 17

Changes in concentration and mass balances for nitrogen (N) and phosphorus (P) using
$MgCl_2$ and NaOH. Municipal Wastewater Case 3.

| Nutrient | Influent centration mg/L | Effluent Con- Concentration mg/L | Mass Inflow Initial Manure | Recovered Solid | Recovered by Membrane mg (% of initial) | Effluent | Unaccounted | Total Recovery |
|---|---|---|---|---|---|---|---|---|
| N | 939 | 11 | 1409 (100%) | 15 (1.06%) | 1182 (83.89%) | 17 (1.21%) | 195 (13.84%) | 1197 (84.95%) |
| P | 133 | 76 | 200 (100%) | 127 (63.50%) | 0 (0%) | 114 (57.00%) | 0 (0%) | 127 (63.50%) |

Wastewater supplemented initially with 1000 mg/L of alkalinity as potassium bicarbonate.
N recovery during 9 days using gas-permeable membrane module and aeration.
P precipitation: 5.42 mmol/L Mg added as $MgCl_2$ and 2.5 mmol/L NaOH added to increase pH to 9.2 end point.
Initial pH = 8.38; pH of effluent from N removal tank = 9.29; pH after $MgCl_2$ addition = 9.17; pH after NaOH addition = 9.54.

TABLE 18

Composition of recovered solid in a system using alkalinity supplementation and approximately 5.42 $MgCl_2$ and approximately 2.5 mmol/L NaOH. Municipal Wastewater Case 3.
Composition of Recovered Solid

| N | P ($P_2O_5$) | Mg | Ca | K |
|---|---|---|---|---|
| | % | | | |
| 1.44 | 11.94 (27.40) | 12.68 | 2.20 | 8.64 | the small N recovery was done in the precipitated solids. The final effluent contained significant amounts (624 mg/L) of ammonia compared with the influent (756 mg/L). The precipitation of phosphorus with high ammonia and alkalinity produced a solid material with approximately 29.9% $P_2O_5$ and approximately 10.5% Mg, and with low concentration of N, approximately 2.8%; Ca, approximately 0.45%; and K, approximately 0.39% (Table 20).

The results are shown in Tables 19 and 20 below

TABLE 19

Changes in concentration and mass balances for nitrogen (N) and phosphorus (P) using
$MgCl_2$ and NaOH. Municipal Wastewater Case 4 (Control without N Recovery).

| Nutrient | Influent Concentration mg/L | Effluent Concentration mg/L | Mass Inflow Initial Manure | Recovered Solid | Recovered by Membrane mg (% of initial) | Effluent | Unaccounted | Total Recovery |
|---|---|---|---|---|---|---|---|---|
| N | 756 | 624 | 1134 (100%) | 32 (2.82%) | 0 (0%) | 936 (82.54%) | 166 (14.64%) | 32 (2.82%) |
| P | 101 | 7 | 152 (100%) | 150 (98.68%) | 0 (0%) | 11 (7.24%) | 0 (0%) | 150 (98.68%) |

N recovery using gas-permeable membrane module and aeration was not done in Case 4.
P precipitation: 5.42 mmol/L Mg added as $MgCl_2$ and 28 mmol/L NaOH added to increase pH to 9.2 end point.
Initial pH = 7.84, pH after $MgCl_2$ addition = 7.56, pH after NaOH addition = 9.19.

In case #4 (Control), the P precipitation was done directly in the side-stream effluent without receiving previous N recovery treatment (Tables 19-20). Therefore, the effluent contained high ammonia concentration, approximately 756 mg/L and a pH of 7.84. The side-stream municipal effluent required large amounts of NaOH (28 mmol/L) to increase the pH from 7.8 to 9.2 end-point. After rapid mixing with the $MgCl_2$, the phosphorus quickly precipitated as a solid. Precipitate flocs were visible. The process removed 17.5% of N and 93.1% of P. The percentage of nutrient recovered divided by nutrient removed was 16.2% and 106.4% for N and P respectively. Total Recovery (percentage of nutrient recovered divided by initial nutrient in the effluent) was low for N, approximately 2.8%, and high for P, approximately 98.7% (Table 19). Since there was no N recovery module,

TABLE 20

Composition of recovered solid in a system using approximately 5.42 mmol/L $MgCl_2$ and approximately 28 mmol/L NaOH. Municipal Wastewater Case 4 (Control without N Recovery).
Composition of Recovered Solid

| N | P ($P_2O_5$) | Mg | Ca | K |
|---|---|---|---|---|
| | % | | | |
| 2.80 | 13.01 (29.86) | 10.54 | 0.45 | 0.39 |

Figure 13:
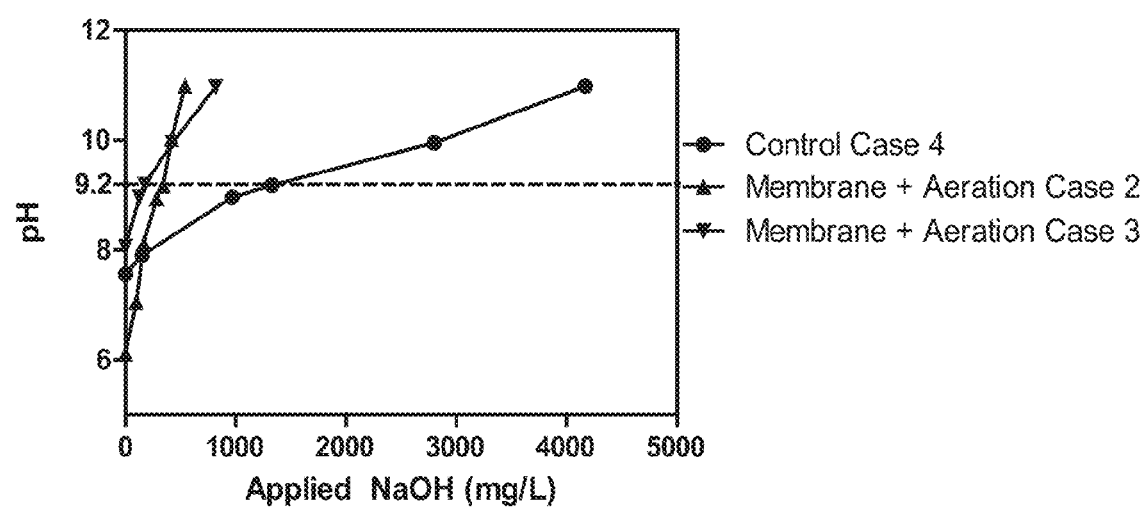
FIG. 13 is a graph showing the effect of alkali addition on pH of municipal wastewater during precipitation of phosphorus with $MgCl_2$ and NaOH of wastewater that received N recovery pretreatment. Due to higher carbonate alkalinity and ammonia concentrations, the control required higher amounts of NaOH to reach a pH>9 that optimizes phosphorus precipitation.
Figure 14:
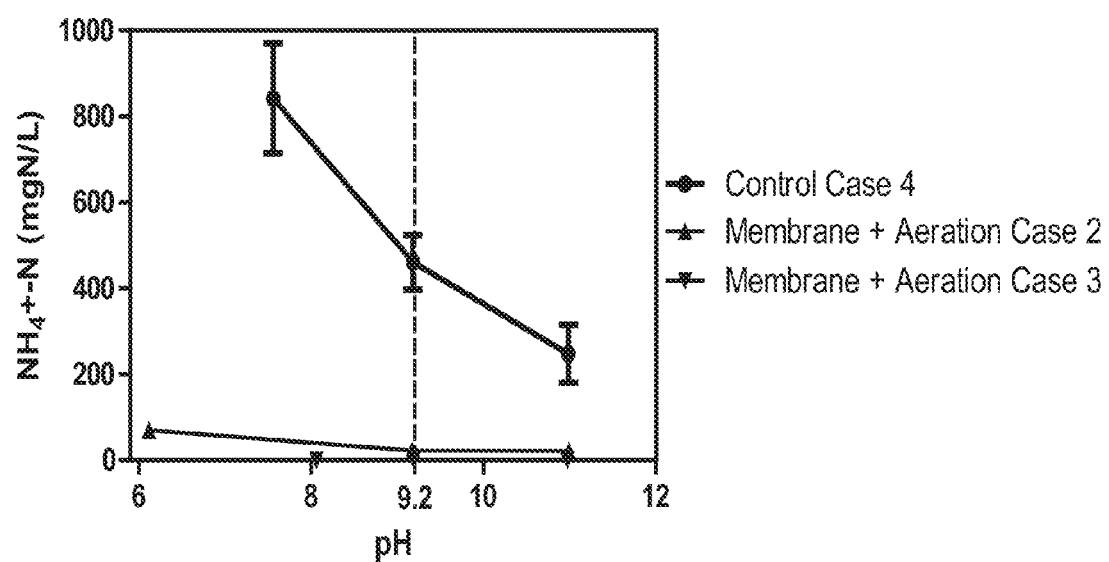
FIG. 14 is a graph showing the effect of pH changes as a result of alkali addition on ammonia concentration of municipal wastewater during precipitation of phosphorus with $MgCl_2$ and NaOH of wastewater that received N recovery pretreatment in cases 2 and 3 vs. a control that did not receive N recovery pretreatment.
Figure 15:
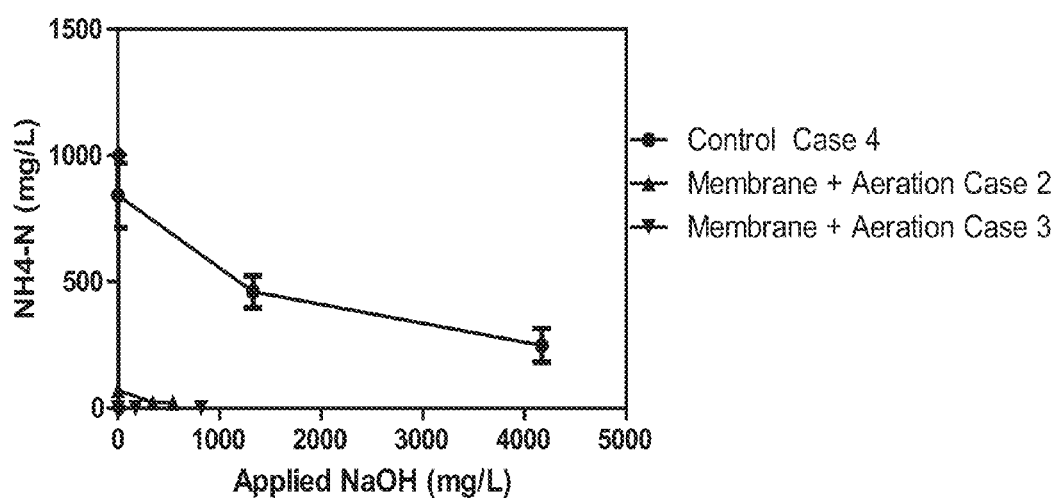
FIG. 15 is a graph showing the effect of alkali addition on ammonia concentration in phosphorus separation tank 48 during phosphorus precipitation with $MgCl_2$ and NaOH of wastewater that received N recovery pretreatment in cases 2 and 3 vs. a control that did not receive N recovery pretreatment. The increase of pH to 9.2 and beyond in the control resulted in significant losses of volatilized ammonia.

Alkali titrations were performed to compare the effect of alkali addition on pH of side-stream municipal wastewater during precipitation of phosphorus with $MgCl_2$ and NaOH (FIGS. 13-15). The titration was done after adding $MgCl_2$ to reach various pH values in the range of 8 to 11. The comparison was done for wastewater that received N recovery pretreatment (cases 2 and 3) vs. a control (case 4) that did not receive N recovery pretreatment. Due to higher ammonia and alkalinity concentrations in the control (case 4), higher amounts of NaOH (33.2 mmol/L) were needed to reach a pH>9.2. In comparison, the amount of NaOH needed by the wastewater that received N recovery pre-treatment and contained low ammonia concentration was much lower, approximately 4.4 to 8.5 mmol/L (FIGS. 13-15 and Table 21). In the control, ammonia loss during pH increases were significant since ammonia concentrations changed from approximately 842 mg/L to 461 mg/L to 248 mg/L at pH 7.6, 9.2 and 11, respectively (FIG. 14) with little N recovery in the solids (<5%).

TABLE 21

Amount of NaOH needed to reach pH of 9.2 during precipitation pf phosphorus from wastewater that received N recovery pretreatment vs. a control that did not receive N recovery pretreatment.

| | MgCl$_2$ added (mmol/L) | Conditions Before NaOH Addition | | | NaOH added to reach pH of approximately 9.2 | |
|---|---|---|---|---|---|---|
| | | NH$_4$—N (mg/L) | Alkalinity (mg CaCO$_3$/L) | pH | mg NaOH/L | mmol NaOH/L |
| Control | 5.42 | 842 | 2932 | 7.56 | 1329 | 33.2 |
| N Recovery Treatment Case 2 | 5.42 | 71 | 92 | 5.98 | 340 | 8.4 |
| N Recovery Treatment Case 3 | 5.42 | 0 | 988 | 8.06 | 174 | 4.4 |

Figure 16:
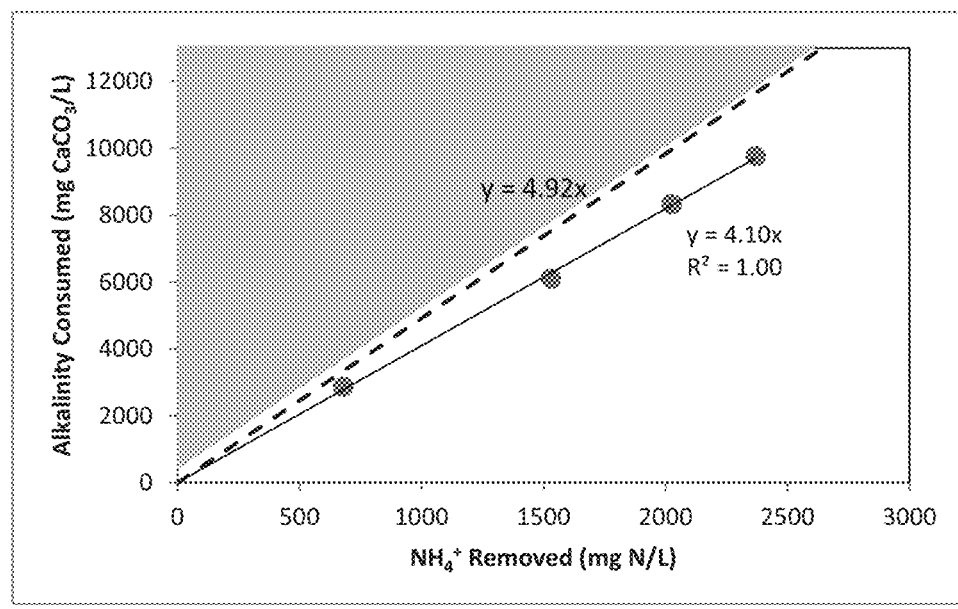
FIG. 16 is a graph showing the relationship between wastewater alkalinity consumption and ammonia removal using gas-permeable membranes and aeration during N recovery using various wastewater types (anaerobically digested swine wastewater, raw swine wastewater, and anaerobically digested side-stream municipal wastewater). The relationship was perfect, $y=4.10x$, $R^2=1.00$. A dotted line, regression line plus 20%, results in a new line, dotted line $y=4.92x$, that generates a shaded area above that can be used to predict when alkali addition is not needed in the present invention to precipitate the phosphorus based on initial carbonate alkalinity and ammonia concentrations of the wastewater.

The relationship between wastewater alkalinity consumption and ammonia removal using gas-permeable membranes and aeration during N recovery was determined using a variety of wastewater types (anaerobically digested swine wastewater, raw swine wastewater and anaerobically digested side-stream municipal wastewater) (Table 22 and FIG. 16). The relationship was perfect (y=4.10x, R$^2$=1.00). This means that at least 4.1 mg/L of alkalinity is needed for every 1 mg/L of ammonia being removed from wastewater using gas-permeable membrane and aeration. A dotted line (regression line plus 20%) results in a new line (y=4.92x) that can be used to predict when alkali addition is not needed in the present invention to precipitate the phosphorus based on initial carbonate alkalinity and ammonia concentrations of the wastewater. This corresponds with the shaded area above the dotted line Y=4.92X shown in FIG. 16. When the initial ammonia and alkalinity concentrations of a wastewater fall in the shaded area, it is anticipated the alkali addition is not needed and the first embodiment (FIG. 1) can be used. On the other hand, when the ammonia and alkalinity concentrations of a wastewater falls below the dotted line, alkali addition is needed and the third embodiment (FIG. 8) can be used instead to effectively precipitate and recover the phosphorus after ammonia recovery.

The results are shown in Tables 22 below and FIG. 16

TABLE 22

Relationship between wastewater alkalinity and ammonia removal using gas-permeable membranes and aeration during N recovery step.

| | Anaerobically Digested Swine Wastewater Farm 1 | Anaerobically Digested Swine Wastewater Farm 2 | Raw Swine Manure Farm 3 | Anaerobically Digested Side Stream Municipal Wastewater |
|---|---|---|---|---|
| Initial Alkalinity (mg CaCO$_3$/L) | 11365 | 8121 | 13350 | 2995 |
| Final Alkalinity (mg CaCO$_3$/L) | 3034 | 2018 | 3590 | 130 |
| Initial NH$_4$$^+$ (mg N/L) | 2089 | 1554 | 2390 | 728 |
| Final NH$_4$$^+$ (mg N/L) | 64 | 23 | 20 | 49 |
| Final pH | 9.26 | 9.17 | 9.20 | 6.99 |
| Initial Alkalinity:Initial NH$_4$$^+$ Ratio | 5.44 | 5.23 | 5.59 | 4.11 |
| Alkalinity Consumed (mg CaCO$_3$/L) | 8331 | 6103 | 9760 | 2865 |
| NH$_4$$^+$ Removed (mg N/L) | 2025 | 1531 | 2370 | 679 |
| Alkalinity Consumed:NH$_4$$^+$ Removed Ratio | 4.11 | 3.99 | 4.12 | 4.22 |

Alkalinity consumed = Initial alkalinity − final alkalinity
NH$_4$$^+$ Removed = Initial NH$_4$$^+$ − final NH$_4$$^+$ It will be clear to a person skilled in the art that the scope of the present invention is not limited to the examples discussed above, but that various changes and modifications thereof are possible without departing from the scope Index of the invention as defined in the appended claims.

INDEX OF THE ELEMENTS

2. Stripping Acid Solution Reservoir/Nitrogen Concentration Tank
3. Stripping Acid
5. Waste sludge
6. Liquid Effluent
7. Solids separator
15. Membrane Module
17. Mixer
18. Blower
20. System
23. Anaerobic Digester
25. pH meter and controller
30. Magnesium Chloride Dispenser
31. Alkali dispenser
40. Membrane Assembly entry opening
42. Membrane Assembly Exit opening
46. Ammonia Separation Tank
48. Phosphorus Separation Tank
50. Phosphorus Recovery Tank

We claim:

1. A system for reducing ammonia and phosphorus concentration in liquid effluents comprising:
at least one gas permeable membrane manifold in an ammonia removal tank allowing for the diffusion of ammonia gas from said liquid effluent into said membrane in said manifold;
a first reservoir containing a stripping solution;
a first delivery system for (i) delivering the stripping solution from the first reservoir to said membrane manifold to chemically change the ammonia gas to ammonia salts, and (ii) for carrying the salts to said first reservoir containing said stripping solution, wherein said delivery system comprises (a) a pump having an intake end and a discharge end, (b) a first hollow tube having one end attached to the discharge end of the pump and a second end attached to a first side of said gas permeable membrane manifold, and (c) a second hollow tube having a first end attached to a second side of said gas permeable membrane and a second end disposed above or in said first reservoir for discharging ammonium salts to said first reservoir;
a second reservoir containing a phosphorous precipitating agent; and
a second delivery system for adding the phosphorus precipitating agent to said effluent.

2. The system of claim 1, wherein the liquid effluent contains an amount of phosphorus, and
wherein the second delivery system is configured to add the phosphorus precipitating agent to the liquid effluent in an amount to precipitate at least about 93% of the amount of phosphorus in said liquid effluent.

3. The system of claim 1 further comprising a phosphorus removal tank,
wherein said phosphorus precipitating agent is added to said phosphorus removal tank receiving liquid effluent from said ammonia removal tank having said gas permeable membrane manifold, and
wherein said effluent has been stripped of ammonia and has a pH greater than about 9.

4. The system of claim 1 wherein said phosphorus precipitating agent is added to said ammonia removal tank of said system wherein said ammonia removal tank contains an ammonia and phosphorus containing liquid effluent under low aeration having a pH greater than about 9.5.

5. A method for producing ammonium salt and phosphorus from an ammonia- and phosphorus-containing liquid effluent comprising:
ammonium recovery; and
phosphorus recovery,
wherein the ammonium recovery comprises:
(1) capturing ammonia from the liquid effluent within the confines of a gas-permeable membrane manifold, and
(2) causing a stripping solution stored in a reservoir to contact said ammonia to produce ammonium salts and transporting the salts to the reservoir for collection, and
wherein the phosphorus recovery comprises:
(1) adding a phosphorus precipitating agent to said liquid effluent and allowing said precipitated phosphorus to settle in a tank, and
(2) collecting said precipitated phosphorus.

6. The method of claim 5, wherein the ammonium recovery is conducted prior to the phosphorus recovery.

7. The method of claim 5, wherein the ammonium recovery is conducted substantially simultaneously with the phosphorus recovery.

8. The method of claim 5, further comprising providing low rate aeration of the liquid effluent.

9. The method of claim 5, wherein the phosphorus precipitating agent is magnesium chloride.

10. The method of claim 5, further comprising adding a nitrification inhibitor to the effluent.

11. The system of claim 1, further comprising a blower connected to the ammonia removal tank, the blower being configured to provide low rate aeration to the effluent in the ammonia removal tank.

12. The system of claim 1, wherein the phosphorus precipitating agent is magnesium chloride.

13. The system of claim 1, wherein the ammonia removal tank in configured to allow the addition of a nitrification inhibitor into the ammonia removal tank.

* * * * *